(12) United States Patent
Kim

(10) Patent No.: US 12,059,088 B2
(45) Date of Patent: Aug. 13, 2024

(54) SYSTEM AND METHOD FOR PROVIDING MAILBOX MANAGEMENT SERVICE

(71) Applicant: Rebecca Yoomi Kim, Encino, CA (US)

(72) Inventor: Rebecca Yoomi Kim, Encino, CA (US)

( * ) Notice: Subject to any disclaimer, the term of this patent is extended or adjusted under 35 U.S.C. 154(b) by 63 days.

(21) Appl. No.: 17/835,774

(22) Filed: Jun. 8, 2022

(65) Prior Publication Data

US 2023/0320510 A1    Oct. 12, 2023

Related U.S. Application Data

(60) Provisional application No. 63/328,175, filed on Apr. 6, 2022.

(51) Int. Cl.
| | |
|---|---|
| *A47G 29/12* | (2006.01) |
| *A47G 29/122* | (2006.01) |
| *A47G 29/124* | (2006.01) |

(52) U.S. Cl.
CPC ..... *A47G 29/1214* (2013.01); *A47G 29/1225* (2013.01); *A47G 29/124* (2013.01); *A47G 2029/1226* (2013.01); *A47G 2029/1257* (2017.08)

(58) Field of Classification Search
CPC ............ A47G 29/1214; A47G 29/1225; A47G 29/124; A47G 2029/1257; A47G 2029/1226
USPC ....................................................... 340/569
See application file for complete search history.

(56) References Cited

U.S. PATENT DOCUMENTS

| | | | | |
|---|---|---|---|---|
| 6,995,671 | B2* | 2/2006 | Dutta | A47G 29/30 |
| | | | | 340/569 |
| 8,346,674 | B2* | 1/2013 | Agrawal | G06Q 10/107 |
| | | | | 705/401 |
| 10,185,984 | B2* | 1/2019 | Shaffer | G06Q 30/0267 |
| 11,386,385 | B2* | 7/2022 | Gillen | G06Q 10/0835 |
| 2003/0132972 | A1* | 7/2003 | Pang | H04L 51/212 |
| | | | | 715/835 |
| 2003/0177072 | A1* | 9/2003 | Bared | G06Q 30/0623 |
| | | | | 705/26.81 |
| 2004/0117326 | A1* | 6/2004 | Amato | G06Q 10/0832 |
| | | | | 705/401 |
| 2006/0245554 | A1* | 11/2006 | Kessler | A47G 29/1225 |
| | | | | 379/88.12 |
| 2007/0094109 | A1* | 4/2007 | Perry | G06Q 10/109 |
| | | | | 705/32 |

(Continued)

*Primary Examiner* — Zhen Y Wu

(74) *Attorney, Agent, or Firm* — Heedong Chae; Lucem, PC

(57) ABSTRACT

A mailbox management system includes a server, a client-mailbox store, a mailbox management application installed on a mobile device of a client-mailbox store operator, and a mobile application installed on a mobile device of a mailbox user. The client-mailbox store includes a physical mailbox assigned to the mailbox user, and the server is connected to the mailbox management application, the mobile application, and a third party virtual mailbox provider. The mailbox management application is configured to receive label information of a mail, and the server is configured to receive the label information from the mobile application and send it to the mobile application of the recipient mailbox user. The mobile application is further configured to present an open and scan action option, a forward action option, a shred action option, and a trash action option to the mailbox user concerning the mail.

19 Claims, 16 Drawing Sheets

(56) References Cited

U.S. PATENT DOCUMENTS

| | | | | |
|---|---|---|---|---|
| 2008/0104176 A1* | 5/2008 | Agrawal | ................ | G06Q 10/08 |
| | | | | 709/206 |
| 2008/0104178 A1* | 5/2008 | Agrawal | .............. | G06Q 10/107 |
| | | | | 709/206 |
| 2008/0104179 A1* | 5/2008 | Agrawal | .............. | G06Q 10/107 |
| | | | | 709/206 |
| 2012/0169461 A1* | 7/2012 | Dubois, Jr. | ........ | G07C 9/00309 |
| | | | | 340/5.2 |
| 2013/0212037 A1* | 8/2013 | Briggman | ............ | G06Q 10/083 |
| | | | | 705/341 |
| 2014/0114828 A1* | 4/2014 | Sagi | ..................... | G06Q 10/107 |
| | | | | 705/34 |
| 2018/0075503 A1* | 3/2018 | Ryner | ................ | G06F 16/9538 |
| 2019/0057335 A1* | 2/2019 | Dyer | ................ | G06Q 10/06311 |
| 2022/0061571 A1* | 3/2022 | Milenkovic | ........ | G07C 9/00571 |

* cited by examiner

OPEN AND SCAN    FWD    SHRED    TRASH

Notice ID
110LE81616

Tracking#
9405511899220276981655

Receiving Type
Large Envelope

Location
Office

Action*

Open&Scan  Forward  Shred  Toss  Pick-up

Mails

110LE81616

Note

Signature

Tap to Unlock

Action ID*

Cancel    Save

Date
10/13/2020

Time
3:39 PM

Mails
 110P57269

Status
Completed

Note from Center
Staci Davidson:old 237 package receiving
P57269, P50727

Charge
$12.00

Action ID
A110P5191

Pick-up Signature

End-User Side View

Mailroom Side View

SYSTEM AND METHOD FOR PROVIDING MAILBOX MANAGEMENT SERVICE

CROSS-REFERENCE TO RELATED APPLICATIONS

This application claims priority to U.S. provisional patent application No. 63/328,175 that was filed on Apr. 6, 2022, the disclosure of which is incorporated herein by reference in its entirety.

FIELD OF THE INVENTION

The present invention relates to a mail/mailbox management system, and more particularly, to a system and method for providing a mailbox management service to a client-mailbox store and a mailbox user.

BACKGROUND OF THE INVENTION

In this age of digital interconnectivity, businesses and individuals still rely heavily, more so than ever, on existing public and private mail infrastructure for processing and completing shipments of mail (everything from stationary correspondence to room-sized packages and crates) to their intended recipients. The market size for offline mailbox centers is around $8 billion. With the rise of virtual mailboxes, customers may virtually open, read, and dispose their mailed letters from anywhere provided that the customers have Internet access and signed up to a virtual mailbox provider. In 2018, the value of the virtual mailbox market was $1.3 billion, and it has grown 75% from 2019 to 2020. Projections expect that the virtual mailbox market will be valued at $3.63 billion by 2026.

Mailbox Centers are typically existing brick-and-mortar businesses that offer offline, private mailbox rentals/subscriptions. In the United States alone, there are approximately 60,000 of these mailbox centers and subscription revenues for such private mailboxes may reach $2.8 million per month. However, such mailbox centers often lack virtual mailbox services as well as system(s) that can provide such services and performance metrics that can increase business efficiency. Without a system to allow small private mailbox businesses to leverage their existing business for value-added options like virtual mailboxes, such small business may suffer as virtual mailboxes services become more popular. In addition, if mailbox center users want to use a virtual mailbox, they have to subscribe to a virtual mailbox in addition to a physical mailbox center. Therefore, there is a need to provide small businesses with tool(s) to allow them to foster in this digital age and allow the physical mailbox users to use a virtual mailbox in addition to the physical mailbox.

Additionally, Mailbox Centers may include other brick-and-mortar businesses and/or operations such as business centers, company mailrooms, building mail rooms, property management companies, HOA management groups, and the like. These Mailbox Centers may also see improvements and increase efficiency when streamlining their mailbox operations, which is often the offline type, by removing redundancies, outsourcing some backroom tasks to third-party solutions, and/or increasing worker efficiency when provided with performance metrics.

Therefore, to solve the above problems, various embodiments of a mail/mailbox management system are provided, as there is a need for a system that accomplishes these goals. This invention is directed to solve these problems and satisfy these long-felt needs.

SUMMARY OF THE INVENTION

The present invention contrives to solve the disadvantages of the prior art. The present invention provides a system that includes a mobile device, a mobile application installed on the mobile device, a server that is communicative with the mobile application through the Internet wherein the mobile application may be used by mailbox staff, carrier, or mailbox users.

The object of the invention is to provide a system for providing a mailbox management service, which includes a server, a client-mailbox store, a mailbox management application installed on a mobile device of a client-mailbox store operator, and a mobile application installed on a mobile device of a mailbox user. The mailbox management application and the mobile application may be the same application with different user types, or may be two separate applications, one for a client-mailbox store operator and the other for a mailbox user. The client-mailbox store includes a physical mailbox assigned to the mailbox user. The server is connected to the mailbox management application and the mobile application, and the server is connected to a third party virtual mailbox provider as well. The mailbox management application is configured to receive label information of a mail, which the client-mailbox store receives from a carrier, from the client-mailbox store operator, and the server is configured to receive the label information of the mail from the mobile application and send it to the mobile application of the mailbox user if the mail is directed to the mailbox user.

The mobile application is configured to present an open and scan action option, a forward action option, a shred action option, and a trash action option to the mailbox user concerning the mail. Upon selection of the open and scan action, the mobile application is configured to place an order to the client-mailbox store to open the mail and scan contents therein, and upon receiving the order of the open and scan action, the mailbox management application is configured to receive and transmit to the server a scanned copy of the contents of the mail and the server is configured to send the scanned copy of the contents of the mail to the mobile device of the mailbox user such that the client-mailbox store operator processes the order of the open and scan action by opening the mail and scanning the contents of the mail using the mailbox management application. Upon selection of the forward action option, the mobile application is configured to place an order to the client-mailbox store to forward the mail to an address designated by the mailbox user. Upon selection of the shred action option, the mobile application is configured to place an order to the client-mailbox store to shred the mail, and upon selection of the trash action option, the mobile application is configured to place an order to the client-mailbox store to trash the mail.

Another object of the present invention is to provide a system for providing a mailbox management service, which includes a server, a plurality of client-mailbox stores, a mailbox management application installed for each client-mailbox store, and a mobile application installed on a mobile device of a mailbox user. Each client-mailbox store includes physical mailboxes. The server is connected to the mailbox management application and the mobile application, and the server is connected to a plurality of third party virtual mailbox providers as well. Upon receiving a mail from a carrier, the server is configured to search the mailbox user database of the server in order to find a matching mailbox user which matches label information of the mail, and upon finding the matching mailbox user, the server is configured to send the label information of the mail to the matching mailbox user.

If the server fails to find the matching mailbox user from the mailbox user database, the server is configured to send a request to the third party virtual mailbox provider to find the matching mailbox user from a mailbox user database of the third party virtual mailbox provider. In addition, the mailbox management application is configured to allow a client-mailbox store operator to assign the mail to the mailbox user if the mailbox user partially matches the label information of the mail. If the mailbox user partially matches the label information of the mail and the client-mailbox store operator assigns the mail to the mailbox user, the server is configured to save the unmatched label information of the mail to the mailbox user database.

The advantages of the present invention are: (1) the present invention provides mailbox users with additional online service concerning their mails delivered to their mailboxes; (2) using the present invention, physical mailbox users do not have to additionally subscribe to a virtual mailbox service; (3) using the online service of the present invention, the mailbox users may not have to go to their physical mailboxes; (4) the present invention is integrated with a third party virtual mailbox user to allow the physical mailbox user to use the third party virtual mailbox; (5) the present invention provides small mailbox rental businesses with value-added virtual mailbox services; (6) the present invention allows small mailbox rental businesses to manage and organize their physical mailbox locations; (7) the present invention allows small mailbox rental businesses to leverage their existing supply of physical mailboxes for virtual mailbox services; (8) the present invention provides metrics that can measure and help improve staff performances; (9) the present invention allows small mailbox rental business to operate the business over the cloud; (10) the present invention provides convenience to customers to either choose to use physical and/or virtual mailbox services from nearby small businesses or from the comfort of their own homes; and (11) the present invention allows small mailbox rental businesses to find (quickly) the third-party virtual mailbox service provider associated with a third-party virtual mailbox user.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF EMBODIMENTS OF THE INVENTION

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

Also, as used in the specification including the appended claims, the abbreviation of "db" shall include singular and plural forms of the term "database." The term "database" can be defined as "a collection of data organized especially for rapid search and retrieval (as by a computing device)." Furthermore, "db" can be modified by other term(s) to denote a quality or type of the database, to indicate its quantity or extent, or to specify the database as distinct from something else.

Figure 1:
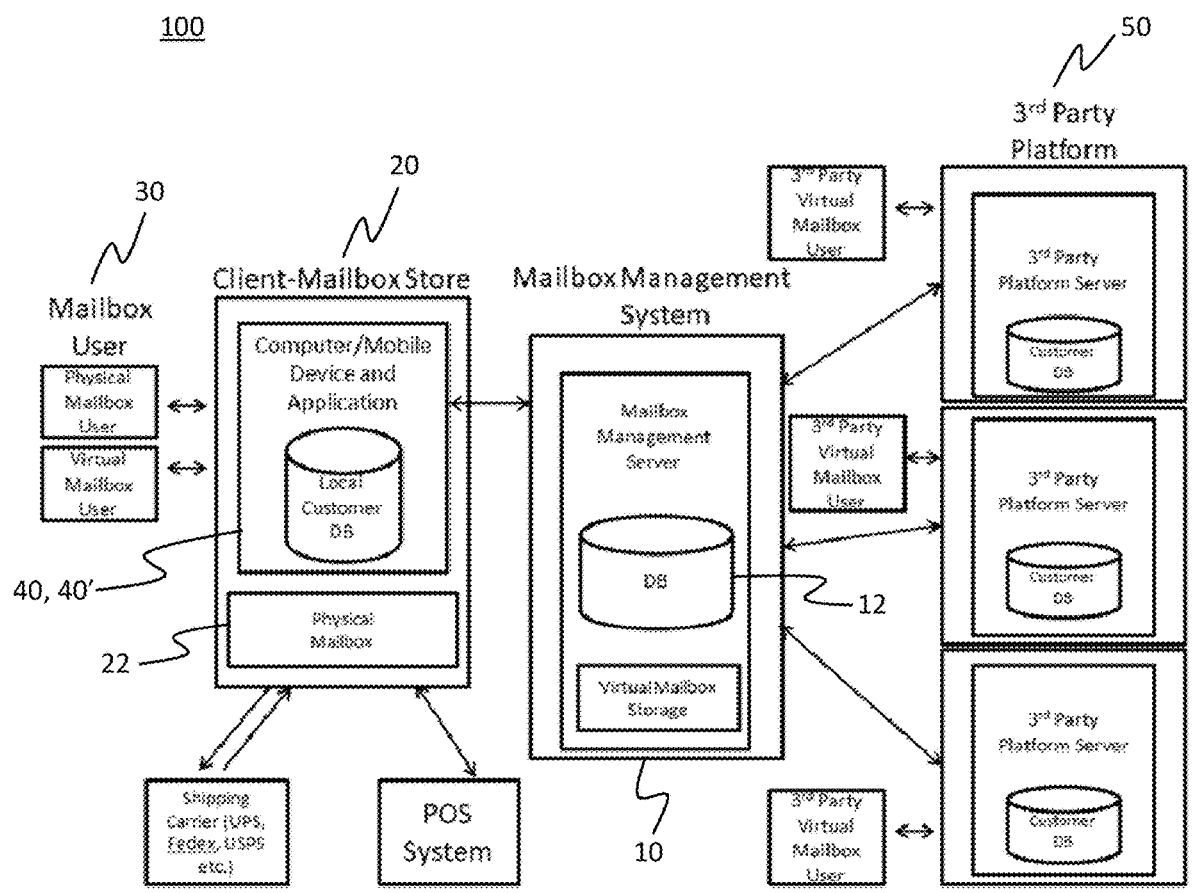
FIG. 1 shows a schematic view of a system according to embodiments of the present invention.
Figure 2:
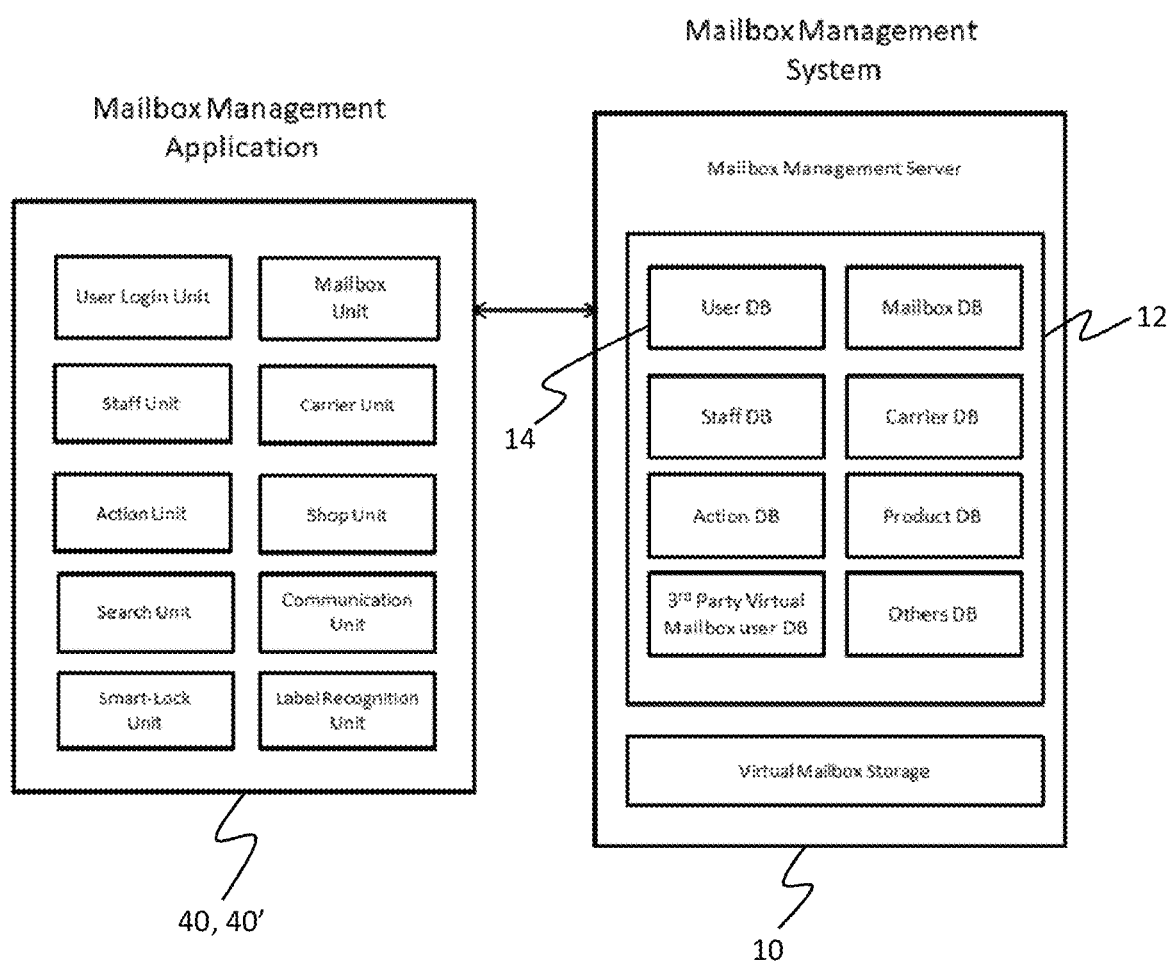
FIG. 2 shows a schematic view of the application and management system of the system according to embodiments of the present invention.
Figure 3:
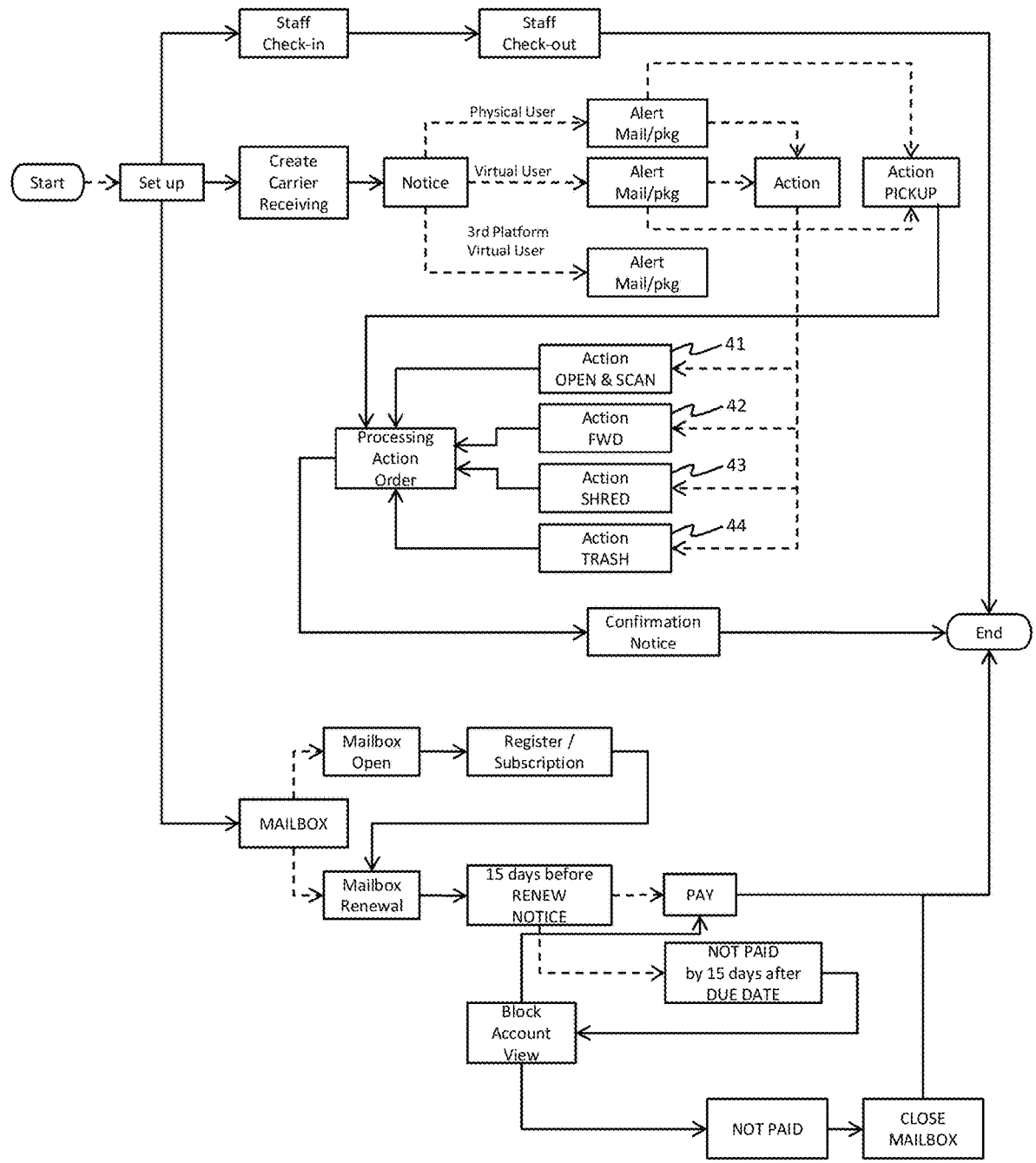
FIG. 3 shows a flowchart showing an example process of the system according to embodiments of the present invention.

FIG. 1 shows a schematic view of the system 100 of the present invention, and FIG. 2 shows a schematic view of the application 40, 40' and the server for mailbox management system. In addition, FIG. 3 shows a flowchart showing an example process of the system 100 according to embodiments of the present invention.

The system 100 of the present invention provides a mailbox management service and includes a server 10, a client-mailbox store 20, a mailbox management application 40' installed on a mobile device of a client-mailbox store operator, and a mobile application 40 installed on a mobile device of a mailbox user. The server 10 includes a database 12, and the client-mailbox store 20 includes a physical mailbox 22 assigned to the mailbox user 30. The mailbox management application 40' is connected to a camera of the mobile device of the client-mailbox store operator, and the server 10 is connected to the mailbox management application 40' and the mobile application 40. In addition, the server 10 is connected to a third party virtual mailbox provider 50, and the database 12 includes a mailbox user database 14. The mailbox management application 40' and the mobile application 40 may be the same application with different user types, or may be two separate applications, one for a client-mailbox store operator and the other for a mailbox user 30.

The mailbox management application 40' is configured to receive label information of a mail, which the client-mailbox store 20 receives from a carrier, from the client-mailbox store operator, and the server 10 is configured to receive the label information of the mail from the mobile application 40 and send it to the mobile application 40 of the mailbox user 30 if the mail is directed to the mailbox user 30. Here, a mail includes a parcel or package as well, and a mobile device includes a computer device, a desktop computer, a laptop computer, tablet, PDA (personal desktop assistant), mobile phone, smart watches, and the like.

The mobile application 40 is configured to present an open and scan action option 41 to the mailbox user 30 concerning the mail, and upon selection of the open and scan action 41, the mobile application 40 is configured to place an order to the client-mailbox store 20 to open the mail and scan contents therein. Upon receiving the order of the open and scan action 41, the mailbox management application 40' is configured to receive and transmit to the server a scanned copy of the contents of the mail and the server 10 is configured to send the scanned copy of the contents of the mail to the mobile device of the mailbox user 30 such that the client-mailbox store operator processes the order of the open and scan action 41 by opening the mail and scanning the contents of the mail using the mailbox management application 40'.

In addition, the mobile application 40 is further configured to present a forward action option 42, a shred action option 43, and a trash action option 44. Upon selection of the forward action option 42, the mobile application 40 is configured to place an order to the client-mailbox store 20 to forward the mail to an address designated by the mailbox user 30, and upon receiving the order of the forward action option 42, the mailbox management application 40' is configured to notify the client-mailbox store operator of the order of the forward action option 42 so that the client-mailbox store operator processes the order of the forward action option 42 by forwarding the mail to the address designated by the mailbox user 30.

Furthermore, upon selection of the shred action option 43, the mobile application 40 is configured to place an order to the client-mailbox store 20 to shred the mail, and upon receiving the order of the shred action option 43, the mailbox management application 40' is configured to notify the client-mailbox store operator of the order of the shred action option 43 so that the client-mailbox store operator processes the order of the shred action option 43 by shredding the mail. Upon selection of the trash action option 44, the mobile application 40 is configured to place an order to the client-mailbox store 20 to trash the mail, and upon receiving the order of the trash action option 44, the mailbox management application 40' is configured to notify the client-mailbox store operator of the order of the trash action option 44 so that the client-mailbox store operator processes the order of the trash action option 44 by trashing the mail.

Upon receiving the label information of the mail, the server 10 is configured to search the mailbox user database in order to find a matching mailbox user which matches the label information of the mail. In order to find the matching mailbox user, the server 10 checks whether there is any name and address from the mailbox user database which matches the name and address of the label information. If the server 10 fails to find the matching mailbox user from the mailbox user database, the server is configured to send a request to the third party virtual mailbox provider 50 to find the matching mailbox user from a mailbox user database of the third party virtual mailbox provider 50.

The server 10 is configured to address or correct any typographical error in the name or address of the label information, and consider alternative spellings of the name or address of the label information. Furthermore, the mailbox management application 40' is configured to allow the client-mailbox store operator to assign the mail to the mailbox user if the mailbox user 30 partially matches the label information of the mail. If the mailbox user 30 partially matches the label information of the mail and the client-mailbox store operator assigns the mail to the mailbox user 30, the server 10 saves the unmatched label information of the mail to the mailbox user database so that the saved information can be used for future searches.

The client-mailbox store 20 includes a smart lock 60 installed on a door of the client-mailbox store 20 to enter the client-mailbox store 20, and the smart lock 60 is constructed to open using the mobile application 40 through near field communication ("NFC") between the smart lock 60 and the mobile device of the mailbox user 30. Usually, the door of the client-mailbox store 20 is open during store hours whereas it is closed after store hours. The mailbox user 30 can open the smart lock 60 using his mobile device and enter the client-mailbox store 20 for after hour pick-ups of physical mail.

In addition, the mobile device of the mailbox user 30 further includes a global positioning system ("GPS") and the server 10 is connected to a door of the physical mailbox 22 assigned to the mailbox user 30. If the mobile device of the mailbox user 30 is determined to be at the client-mailbox store 20 via the GPS, the server 10 is configured to send to the mobile device of the mailbox user 30 a message to inquire to open the physical mailbox 22 assigned to the mailbox user 30. Upon receiving confirmation to open the physical mailbox 22 from the mailbox user 30, the physical mailbox 22 is constructed to open the door of the physical mailbox 22. Furthermore, before closing and locking the door of the physical mailbox 22, the server 10 is configured to send to the mobile device of the mailbox user 30 a message to confirm a pick-up of the mail. Accordingly, locking the door of the physical mailbox 22 and confirmation of mail pick-up can be handled together, and thus, it is more convenient and the database can be timely updated to avoid duplicative work.

The client-mailbox store operator may be a manager or a staff, and the mailbox management application 40' provides different access levels between the manager and the staff. The database includes a staff data base, and the staff data base at least includes a staff name, a staff contact information, and a staff timesheet. The staff data base may further include a time in and a time out of the staff where the mobile device of the client-mailbox store operator includes a GPS to find out whether the mobile device of the client-mailbox store operator is at the client-mailbox store 20. If the GPS says that the mobile device of the staff is at the client-mailbox store 20, the mailbox management application 40' is configured to record the time in of the staff. If the GPS says that the mobile device of the staff is not at the client-mailbox store 20 after the time in of the staff, the mobile application 40 is configured to send a message to confirm the time out of the staff.

The mobile application may further include a shop unit that displays goods for sale provided at the client-mailbox store. Preferably, the shop unit provides an option of pick-up of a purchased good from the physical mailbox 22 of the mailbox user 30 or delivery of the purchased good to a provided address.

The server 10 is connected to a shipping service provider and the mobile application 40 is configured to present a forward action option 42. Upon selection of the forward action option 42, the mobile application is configured to place an order to the client-mailbox store 20 to forward the mail to an address designated by the mailbox user 30. Upon receiving the order of the forward action option 42, the server 10 is configured to send the label information of the mail and the address designated by the mailbox user to the shipping service provider.

In the alternative embodiment, the system 100 of the present invention provides a mailbox management service and includes a server 10, a plurality of client-mailbox stores 20, a mailbox management application 40' installed for each client-mailbox store 20, and a mobile application 40 installed on a mobile device of a mailbox user 30. The server 10 includes a database, and each client-mailbox store 20 includes physical mailboxes 22. The server 10 is connected to the mailbox management application 40' and the mobile application 40, and the server 10 is connected to a plurality of third party virtual mailbox providers as well. In addition, the database 12 includes a mailbox user database. Upon receiving a mail from a carrier, the server 10 is configured to search the mailbox user database in order to find a matching mailbox user which matches label information of the mail, and upon finding the matching mailbox user, the server 10 is configured to send the label information of the mail to the matching mailbox user.

If the server 10 fails to find the matching mailbox user from the mailbox user database, the server 10 is configured to send a request to the third party virtual mailbox provider to find the matching mailbox user from a mailbox user database of the third party virtual mailbox provider.

The mailbox management application 40' is configured to allow a client-mailbox store operator to assign the mail to the mailbox user 30 if the mailbox user 30 partially matches the label information of the mail. If the mailbox user 30 partially matches the label information of the mail and the client-mailbox store operator assigns the mail to the mailbox user 30, the server 10 is configured to save unmatched label information of the mail to the mailbox user database. If the mailbox user 30 is the matching mailbox user, the mobile application 40 is configured to present an open and scan action option 41 to the mailbox user 30 concerning the mail. Upon selection of the open and scan action 41, the mobile application 40 is configured to place an order to the client-mailbox store 20 to open the mail and scan contents therein. Upon receiving the order of the open and scan action 41, the mailbox management application 40 is configured to receive and transmit to the server 10 a scanned copy of the contents of the mail and the server 10 is configured to send the scanned copy of the contents of the mail to the mobile device of the mailbox user 30 such that the client-mailbox store operator processes the order of the open and scan action 41 by opening the mail and scanning the contents of the mail using the mailbox management application 40'.

If the mailbox user 30 is the matching mailbox user, the mobile application 40 is further configured to present a forward action option 42, a shred action option 43, and a trash action option 44. Upon selection of the forward action option 42, the mobile application 40 is configured to place an order to the client-mailbox store 20 to forward the mail to an address designated by the mailbox user 30. Upon receiving the order of the forward action option 42, the mailbox management application 40' is configured to notify the client-mailbox store operator of the order of the forward action option 42 so that the client-mailbox store operator processes the order of the forward action option 42 by forwarding the mail to the address designated by the mailbox user 30

Upon selection of the shred action option 43, the mobile application 40 is configured to place an order to the client-mailbox store 20 to shred the mail. Upon receiving the order of the shred action option 43, the mailbox management application 40' is configured to notify the client-mailbox store operator of the order of the shred action option 43 so that the client-mailbox store operator processes the order of the shred action option 43 by shredding the mail.

Upon selection of the trash action option 44, the mobile application 40 is configured to place an order to the client-mailbox store 20 to trash the mail. Upon receiving the order of the trash action option 44, the mailbox management application 40' is configured to notify the client-mailbox store operator of the order of the trash action option 44 so that the client-mailbox store operator processes the order of the trash action option 44 by trashing the mail.

The client-mailbox store 20 further includes a smart lock 60 installed on a door of the client-mailbox store 20 to enter the client-mailbox store 20, and the smart lock 60 is constructed to open using the mobile application through NFC between the smart lock 60 and the mobile device of the mailbox user 30. The mobile device of the mailbox user 30 further includes a GPS and the server 10 is connected to a door of the physical mailbox 22 assigned to the mailbox user 30. If the mobile device of the mailbox user 30 is determined to be at the client-mailbox store 20 via the GPS, the server 10 is configured to send to the mobile device of the mailbox user 30 a message to inquire to open the physical mailbox 22 assigned to the mailbox user 30. Upon receiving confirmation to open the physical mailbox 22 by the mailbox user 30, the physical mailbox 22 is constructed to open the door of the physical mailbox 22.

In one embodiment, as shown in FIG. 1, the system 100 includes a mobile application 40, 40' that is installed on a mobile device. The system further includes a server 10 that can be located in a client-mailbox store (typically a brick-and-mortar operation/store of an owner/manager) or the server 10 can be an off-site server that is operated by the owner/manager or a third-party; in any case, the server 10 is connectable to the Internet and can communicate with the mobile application 40, 40' over the Internet. Accordingly, the off-site server 10 can be considered as a cloud-based server. The mobile application 40, 40' may include a web-based frontend to access and perform at least some of the features of the mobile application 40, 40' via a separate computing device, e.g. a desktop computer, a laptop computer, and the like that may be further configured to operate as thin clients with respect to the server 10. Varying access levels can be configured in the system 100 so that one class of users have access to features designated for that user class and the other classes may have similar access or different access to different features of the mobile application 40, 40'. The client-mailbox store 20 further includes a physical mailbox 22 that provides clients with a uniquely addressable lockable box 22 located on the premises of the client-mailbox store 20, wherein the physical mailbox 22 is constructed to receive mail and/or parcels ("mail/parcel") from a variety of different carriers; and a local customer database 14 stored on the mobile device, on the server 10 or on a computer device. The computer device may be a desktop computer. The mobile device may be a laptop computer, tablet, PDA (personal desktop assistant), mobile phone, smart watches, and the like.

The computer device, the server, and/or the mobile device may include a local customer db 14 stored therein. The local customer db 14 may include data associated with the physical mailbox user 30 and/or the virtual mailbox user 30 as shown in FIG. 1. Physical mailbox users 30 are users with physical mail/parcels and use the physical mailbox 22 of the client-mailbox store 20 for their mailing needs. Virtual mailbox users 30 are users with mail but would like to view the contents of their mail through indirect means such as through their mobile device(s), desktop computers, laptop computers, PDAs, tablets, cell phones, and the like that are connected to the Internet. Third-party virtual mailbox users are users who use third-party virtual mailbox services 50 (labeled as "3rd party platform" 50 in FIG. 1) to view contents of their mail through indirect means similar to that of the virtual mailbox users except that the third-party virtual mailbox users do so using the third-party platform 50 that contracts out the client-mailbox store to use the physical mailboxes (or address) of the client-mailbox store to receive mail/parcels to be scanned and uploaded to the third-party platform by way of the mailbox management system, and then viewed by the third-party virtual mailbox user using the third-party platform.

The mobile application 40, 40' is configured to execute and run from a variety of mobile devices. Furthermore, the mobile application 40, 40' is programmed to recognize and integrate with API's (Application Programming Interface) from mail carriers that include (but are not limited to) the United States Postal Service, United Postal Service, Federal Express, DHL (Dalsey, Hillblom and Lynn), and the like such that the mobile application 40, 40' can receive carrier information from such carriers. The carrier information received from such carriers include (but is not limited to) the carrier's name, parcel quantity, identity of staff who received the parcel, time of shipment, time of shipment creation, and the like. As explained below, some of the above-mentioned carrier information may be obtained by scanning the mailing label from the mail/parcel or from manual input.

As illustrated in FIG. 2, the backend of the mobile application is the mailbox management server 10 that is configured to write, organize, and store the carrier information therein in a carrier db within the db 12 of the mailbox management system's server 10. Since the server 10 is linked and communicative with the mobile application 40, 40' over the internet, the carrier information may be presented to the user in a variety of different forms and formats. The server 10 includes at least one computer wherein each computer includes at least one central processing unit, at least one random access memory stick, and at least one storage means. The storage means may include a hard disk drive, a solid state drive, a hybrid hard disk/solid state drive, any other non-volatile storage, and/or the like. The server 10 may further include a monitor or may be configured to run headless with the monitor.

As shown in the FIG. 2, the server 10 of mailbox management system includes the db 12 which includes several sub-db's that include (but are not limited to) a user db 14, mailbox db, staff db, the carrier db, action db, product db, third-party virtual mailbox user db, and a miscellaneous db. The user db includes (but is not limited to) the following data: user id's, user emails, real name, user addresses, user country, user language, and user contact information. The mailbox db includes (but is not limited to) the following data: unique id's for mailbox, the mailbox number, the mailbox type, any add-ons provided, status of the mailbox, name of the mailbox, subscriber contact information [e.g. phone (landline or mobile)], email, address, term, mailbox fee, add-on fee(s), total fee, renew date, next renew date, member since date, note(s), additional name(s), related notices, related pick-ups by box #, related pick-ups by print name, and related actions. The third-party virtual mailbox db includes (but is not limited to) the following data: unique id's for mailbox, the mailbox number, any add-ons provided, status of the mailbox, name of the mailbox, subscriber contact information [e.g. phone (landline or mobile)], email, address, term, note(s), additional name(s), related notices, related actions, action ID, date of action, time of action, confirmation from the third-party virtual mailbox provider, third-party virtual mailbox provider name, and third-party virtual mailbox provider ID.

The staff db includes (but is not limited to) the following data: staff id, first name, last name, work email, store phone, work phone, start date, hourly wage, email, cellphone, note(s), role, headshot photo, computed name, related carrier receivings, related notices, and related staff timesheets by name. The staff db may further include a staff timesheet db that includes (but is not limited to) the following data: timestamp, date, name, time in, time out, total hours, hourly wage, total wages, hours, minutes, seconds, and number of hours.

The carrier db includes (but is not limited to) the following data: receiving ID, carrier name or abbreviation, quantity, staff handling the mail/parcel, date, time, and related notices. The action db includes (but is not limited to) the following data: mailbox #, date, time, action, mails, note(s), signature, action ID, status, completed date, charge(s), note from the center, FWD tracking #, pick-up signature, email. The product db includes (but is not limited to) the following data: item image(s), product, buy, price, status, description, and product ID. The above listed db and the information stored therein correspond to different units of the mobile application as shown in FIG. 2. As shown the flow of data between the mobile application and the server storing these db's is bidirectional. Furthermore, these db's may be relational db's such that information across several db's can be retrieved or queried simultaneously and be presented together.

Additionally, as shown in FIG. 1, the db of the mailbox management system 10 may be configured to be communicative over the Internet with a customer db of the third-party virtual mailbox provider 50 via API calls using the API of the third-party virtual mailbox provider. Accordingly, the system integrates with the API's offered by the third-party virtual mailbox provider(s) 50, wherein such API's are designed for interconnectivity between different applications and platforms such that users, and systems that use, such API's can customize a myriad of different workflows between different platforms and applications.

A flowchart of an example process of the system is shown in FIG. 3. The mobile application 40, 40' is housed in a software repository that is linked to the operation system on the mobile device. Two of the largest software repositories of this type in the mobile space include Apple App Store® and Google Play™ store. Other examples include (but are not limited to) Samsung Galaxy Apps, LG SmartWorld, Huawei App Store, Sony Apps, Amazon Appstore, and the like. The owner/manager, staff, or the customer may download the mobile application 40, 40' using their respective mobile devices from any of software repositories that are linked to those mobile devices and install the mobile application on their respective mobile devices. When running the mobile application 40, 40' for the first time, represented by the start step shown in FIG. 3, the owner/manager would execute the mobile application my tapping on the icon of the mobile application 40, 40'. A registration screen provides instructions to integrating the mobile application with the API's from Postalmate® as well as any application API's from their Point-of-Sale ("POS") system(s). The server 10 is integrated with third party POS system and third party shipping service provider to exchange shipping rate information, accounting information, shipping label, etc. This integration will complete the data of the present invention and dispose of additional work to manually input updated data. Furthermore, the registration screen may allow additional integration options including integrating with API's from third-party virtual mailbox providers 50. Virtual mailbox is a service provided by certain providers that allows the subscribers to view their mail online. Mail arrives at physical mailboxes housed in facilities owned by the virtual mailbox providers, or housed in other locations contracted out to other parties such as the client-mailbox store shown in FIG. 1. In the former situation, as shown in FIG. 2, the mailbox management system may further include a virtual mailbox storage that is configured to work with the db of the mailbox management system such that if the mailbox type in the mailbox db corresponds to the virtual mailbox service provided by the client-mailbox store, any document or image files corresponding to virtual mail is stored in and retrieved from the virtual mailbox storage. In the latter situation where mail arrives at physical mailboxes 22 housed in facilities owned and/or operated by the client-mailbox store 20, information regarding the received mail/parcels are shared between the client-mailbox store and the third-party virtual mailbox provider 50. The third-party virtual mailbox provider 50, through its API's, makes the third-party virtual mailbox user information accessible to the mailbox management system 10 such that there is cross-communication between the db 12 of the mail management system 10 and the customer db of the third-party virtual mailbox provider 50 as shown. This third-party virtual mailbox user information may be stored in the "third-party virtual mailbox user db" in the server of the mailbox management system or accessible by the server 10.

With respect to FIG. 3, after the mail/parcel arrives at the location of the physical mailbox 22 of the client-mailbox store 20, the owner/manager or the staff of the client-mailbox store 20 inputs the label information of the mail/parcel into the mobile application 40, 40' (manually or by scanning the mailing label with a mobile device using the label recognition unit of the mobile application), and then searches its user db 14 and the third-party virtual mailbox user db via the search unit of the mobile application 40', or via the thin client, to determine whether the label information sufficiently corresponds to any user in the user db 14 or the third-party virtual mailbox user information provided by the third-party virtual mailbox user db (primarily, the third-party virtual mailbox user's name and the private mailbox number for the private mailbox that is allocated to them). The result of this search will be displayed in the mobile application. If there is a match, then the mobile application 40' allows the owner/manager or the staff to upload the scanned mailing label. Then, the server 10 will notify the matching user of the scanned mailing label. If the match is from the third-party virtual mailbox user db, then a confirmation-and-upload weblink is provided in the mobile application for the client-mailbox store owner/manager or staff to click. Clicking this weblink opens up the third-party virtual mailbox provider's webpage or app, which then provides further instructions to upload the scanned mailing label. Clicking the link and performing the upload notifies the third-party virtual mailbox provider of the mail/parcel that was received in the private mailbox designated to the third-party virtual mailbox user. More preferable, the result of the match will be displayed in the mobile application and the system will automatically notify (in the background) the third-party virtual mailbox provider of receipt of a package for their third-party virtual mailbox user.

Following confirmation of a match between the label information and the user in the user db 14 or the third-party virtual mailbox user, the client-mailbox store owner/manager and/or their staff will await for further instructions from the mailbox user 30 or the third-party virtual mailbox user that will be communicated to perform any of the following actions: open the identified mail/parcel and scan the contents as images or PDF's (ISO 32000-1) for the mailbox user 30 or the third-party virtual mailbox user to open and view, forward the mail/parcel to another address, shred the mail/parcel, or trash the mail parcel; there may be additional fees required from the mailbox user 30 or the third-party virtual user for these action steps to be performed. However, there may be a bottleneck in this operation for the third-party virtual mailbox user. Specifically, there may be a delay when the third-party virtual mailbox user, using the third-party virtual mailbox provider's platform, presses or clicks the option to view the mail on their device and actually viewing it. The reason why is that the third-party virtual mailbox user has to wait for the client-mailbox store to receive confirmation from the third-party virtual mailbox provider to perform the actions of opening the mail/parcel, scanning its contents, and uploading the scanned contents to the third-party virtual mailbox provider's platform or provide a link to the third-party virtual mailbox provider who then passes this link to the third-party virtual user. Furthermore, this delay can extend into the next day if the third-party virtual mailbox user desires to view their virtual mail during afterhours if the client-mailbox store is not operating 24 hours a day, seven days a week. Alternatively, it can be stipulated in the agreement between the client-mailbox store 20, the third-party virtual mailbox provider 50, and the third-party virtual mailbox user that the client-mailbox store owner/manager and/or their staff will proceed to scan and upload the contents the mail/package to the third-party virtual mailbox provider following confirmation of the match; opening of the scanned mail may require payment of a fee from the third-party virtual mailbox user. Any other actions (e.g. forwarding, shredding, or trashing and any fees attached to them) will likely require confirmation from the third-party virtual user that is entered through the third-party virtual mailbox provider's platform 50, which is then passed to the client-mailbox store 20. The system of the present embodiment is configured to integrate with several of these third-party virtual mailbox providers as a way to provide physical mailboxes for the third-party virtual mailbox providers.

Following the registration and setup menus/screens steps shown in FIG. 3, the mobile application 40' includes a staff unit, carrier unit, and a mailbox unit that communicate bi-directionally with the staff db, the carrier db, and the mailbox db respectively. As shown in FIG. 3, the staff unit includes a staff check-in module and a staff check-out module. With the staff check-in module, the staff for the owner/manager of the client-mailbox store can check the mobile application for delivery instructions of each member of the staff, number of packages they delivered, and the amount of time that they worked for the client-mailbox store when performing their duties. Meanwhile, the mobile application 40' can output to the server 40 various performance metrics that may be viewable by the staff associated including time spent on package delivery with respect to distance and number of delivery assignments taken and completed. Moreover, if there is a customer complaint or that the volume of mail/parcels being processed is unexpectedly lower than usual, the owner/manager can use the staff unit of the mobile application to track and find out which of the staff might be a cause or a contributing factor to these issues. The owner/manager may take corrective actions with the information provided by the staff unit.

Furthermore, the owner/manager of the client-mailbox store can view the staff unit to view performance metrics of individual members of the staff in addition to those already viewable by the staff. Accordingly, the performance metrics may further include additional data that is only accessible by the owner/manager of the client-mailbox store. Performance metrics that are viewable by the owner/manager of the client-mailbox store may include (but are not limited to) to the following additional data: Number of delivery assignments completed by the staff, customer signatures for individual staff-delivered packages, staff delivery assignments left outstanding, non-deliveries of packages, customer comments regarding the mobile application, customer comments regarding the staff performance, and filed complaints. Therefore, the staff has access to one set of performance metrics and the owner/manager has access to an additional set of performance metrics through different access levels that are delineated by login credentials and/or user classes. An example of the latter is that the owner/manager may be assigned to an admin class, and the staff may be assigned to a staff class to access their respective data available to each of their respective user classes.

The owner/manager can utilize information from the performance metrics to evaluate the job performance of the staff and set staff salaries and bonuses based on the data from the performance metrics. Furthermore, the mobile application may further be configured to award bonus point incentives to the staff who reach certain goal(s), e.g. number of packages properly delivered, timely deliveries, customer satisfaction, and the like. These bonus points may be converted to cash bonuses, gift cards, and other incentives as provided by the owner/manager. Following completion of their workday or assignment(s), the staff can log out from the staff unit as shown in FIG. 3. The time in and time out data will be recorded in the staff db.

As shown in FIG. 3, the carrier unit includes carrier creation screen to setup received carrier information upon initial visit. Following setup of the received carrier information, a carrier screen displays the package information associated with the registered visiting customer and displays incoming shipments. The received carrier information may include the identity of the carrier (full name and/or abbreviation), the quantity of incoming mail/parcels, brief description of the mail/parcel, time that incoming parcels are expected to arrive or have arrived, and (for those of the proper user class) the identity of the staff who takes possession of the received parcel to be delivered to physical mailbox of the physical mailbox user. Some of the received carrier information may be accessible only to the owner/manager, staff, or the physical mailbox user based on their different respective access levels established by the owner/manager in the preferences menu of the mobile application. Furthermore, following proper setup, the carrier screen allows entry of the tracking number by either manually typing the tracking number into a form field that indicates/instructs entry of a tracking number, or by having the mobile application user (owner/manager or staff) tap an icon which executes a subroutine of the mobile application that executes instructions for the label recognition unit as shown in FIG. 2. Physical mail users and the virtual mailbox users may use either method to view tracking information of their mail/packages.

Figure 6:
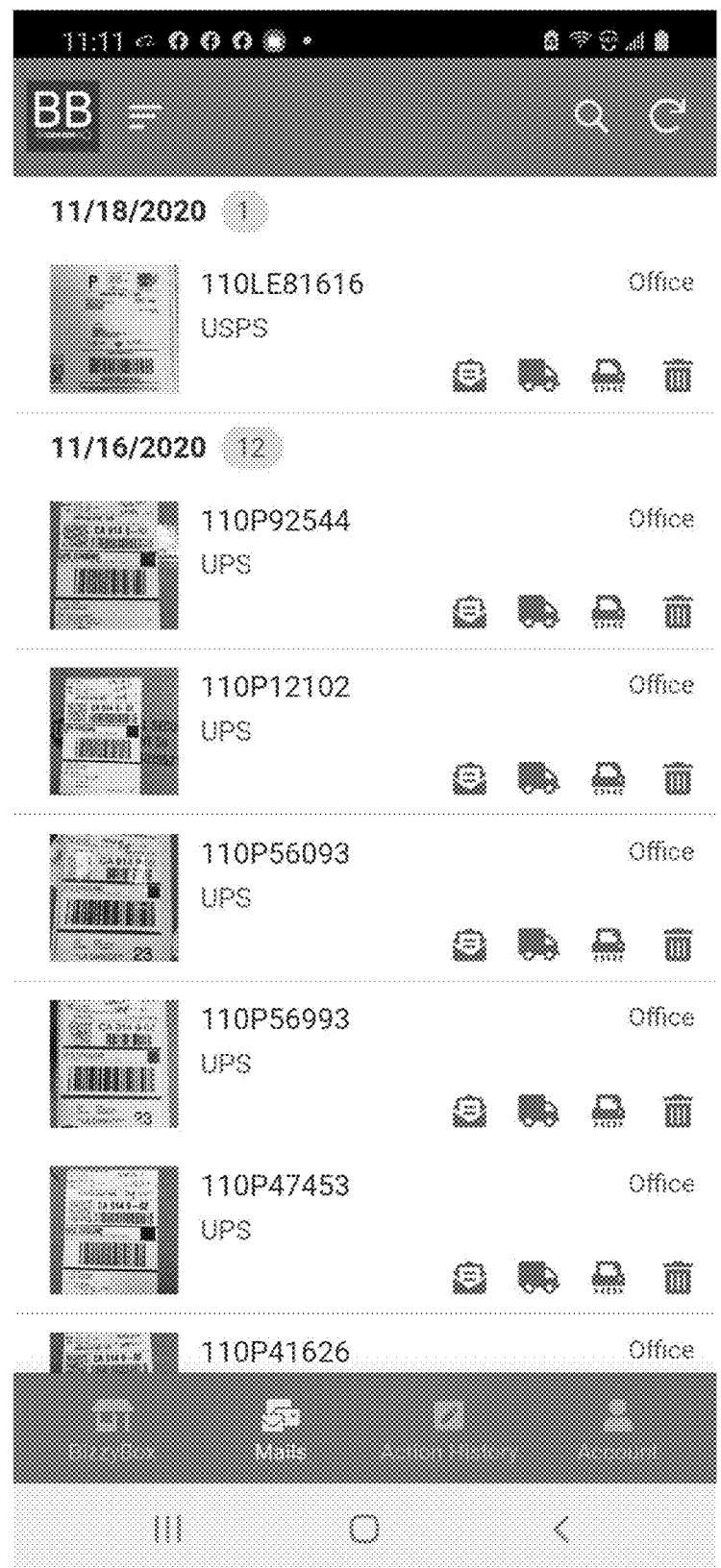
FIG. 6 shows a screenshot from the mobile application of the system according to embodiments of the present invention.
Figure 7:
FIG. 7 shows a screenshot from the mobile application of the system according to embodiments of the present invention.
Figure 7:
Figure 7:
Figure 7:
Figure 7:
Figure 7:
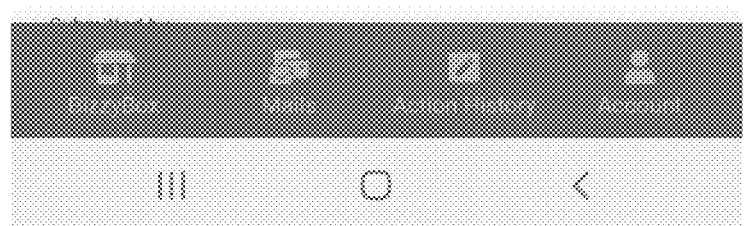

An example of the label recognition unit (but not the only example) includes signals/instructions to a camera of the mobile device to view and scan barcodes, QR codes, mailing labels, and the like such that a tracking number is recognized, scanned, and processed from information or codes displayed on the mailing label of the mail/package. The tracking number will be processed using this information and shown in the carrier screen's form field. As shown in FIGS. 6 and 7, it is preferable that the carrier screen instructs the user (typically the owner/manager or staff) to use the camera of the mobile device to take a picture of the mailing label almost in its entirety. By doing so, the label recognition unit is programmed to recognize the tracking number printed on the mailing label from the picture via object character recognition as well as verifying the tracking number from cross-referencing the scanned barcode that was obtained previously or from co-recognition with of the barcode found in the picture. Furthermore, the label recognition unit is further programmed to use object character recognition to recognize and collect other data from the mailing label. For mail without a barcode, the label recognition unit can recognize and create a note or notice that the scanned mail is without a barcode. All of the pictures taken by the camera of the mobile device are stored on the server and in the mobile device. Furthermore, the mail/package that is recorded in the server is assigned a unique identification number that is displayed in the mails menu of the mobile application as shown in FIG. 6.

FIGS. 3 and 6 show a notice of the mail/packages in the mails menu of the mobile application, which is accessible from the bottom icon bar of the mobile application as shown in FIG. 6; it may be also accessible from the notifications menu of the mobile device that display push notifications from a notification server (explained below). Alternatively, the mails menu icon may be placed on a top bar of the screen of the mobile application. These notices, as shown in FIG. 6, can also alert different types of users of this system. As shown in FIG. 3, the system is configured to accommodate different user types which include (but are not limited to) physical mailbox users, virtual mailbox users, and third-party virtual mailbox users. Physical mailbox users and virtual mailbox users have been described earlier. As shown in FIG. 1, third-party virtual mailbox users use their mobile device or computer to login and use third-party mobile application(s)/platform(s) view and manage their virtual mailbox(es). The third-party virtual mailbox providers still require the use of physical mailboxes for their services as described above. Therefore, the third-party platform of the third-party virtual mailbox providers, as shown in FIG. 1, rely on integrating with the client-mailbox store through the mailbox management system provided by the system of this embodiment. The owner/managers of the client-mailbox store can record the received mail/packages and send notifications to the third-party virtual mail providers, who in turn, send notifications to their third-party virtual mail users.

Accordingly, the system further includes API's that can be recognized by the third-party application such that some of the features available to users on this mobile application are available to third-party virtual mailbox users while using the third-party application/platform. Additionally, the server of the system may further include a notification node to send push notifications to mobile device to notify the user, or the system may be further configured to leverage the already existing notification capabilities of the operating system of the mobile application on the user's mobile device to send such push notifications. The push notifications include information regarding the username of the user id that notifies the user that a package has been received by the system.

For security purposes, the system further features a login unit that includes a login page configured for user entry of login names, emails, and passwords to login and verify users. Other security procedures may be included such as recaptcha, personalized verification questions, and two-factor authentication (2FA) via a 2FA module that verifies the user's mobile device through a return-entry of a unique 2FA code, the unique 2FA code provided to the user via the user's registered email, short-message service/multimedia message service (SMS/MMS), and/or third-party authenticator apps.

Figure 8:
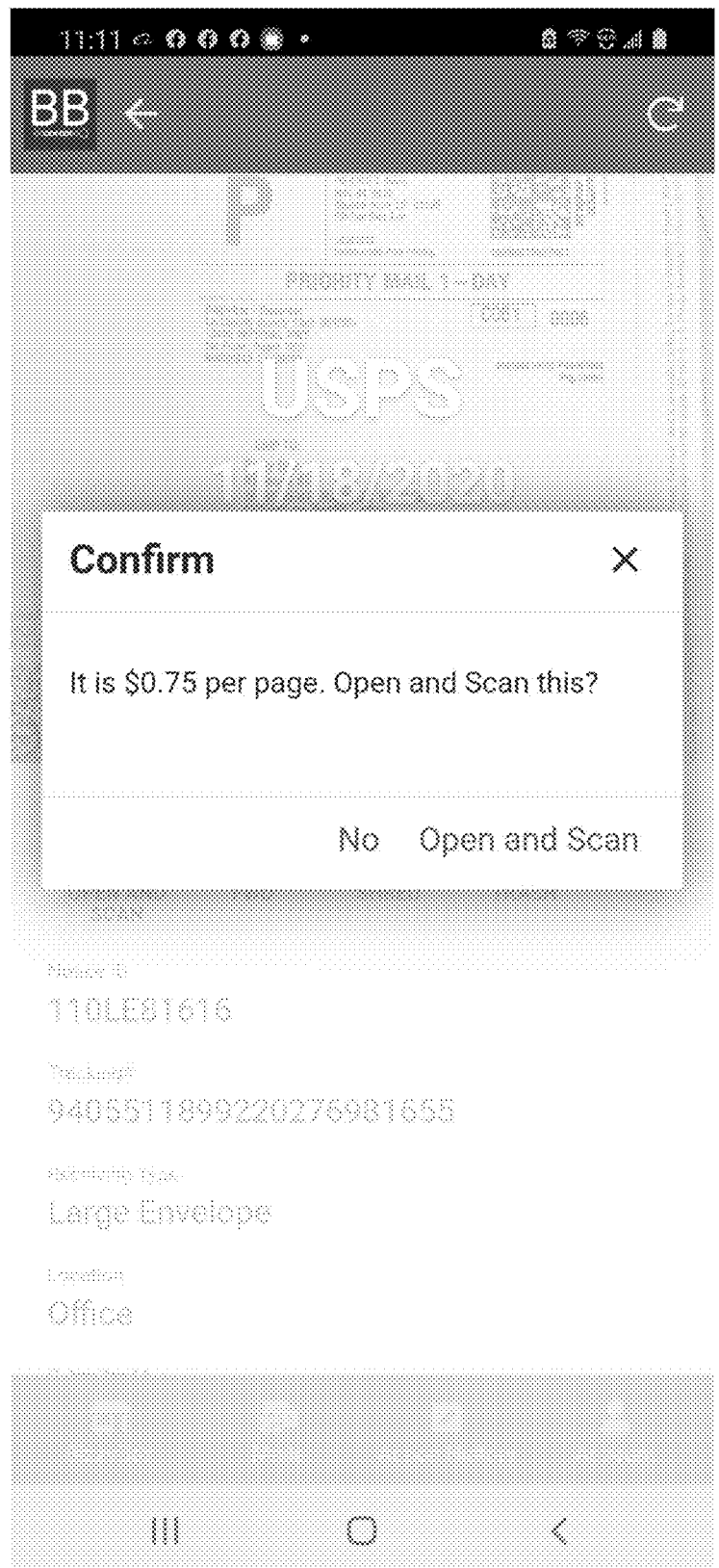
FIG. 8 shows a screenshot from the mobile application of the system according to embodiments of the present invention.
Figure 9:
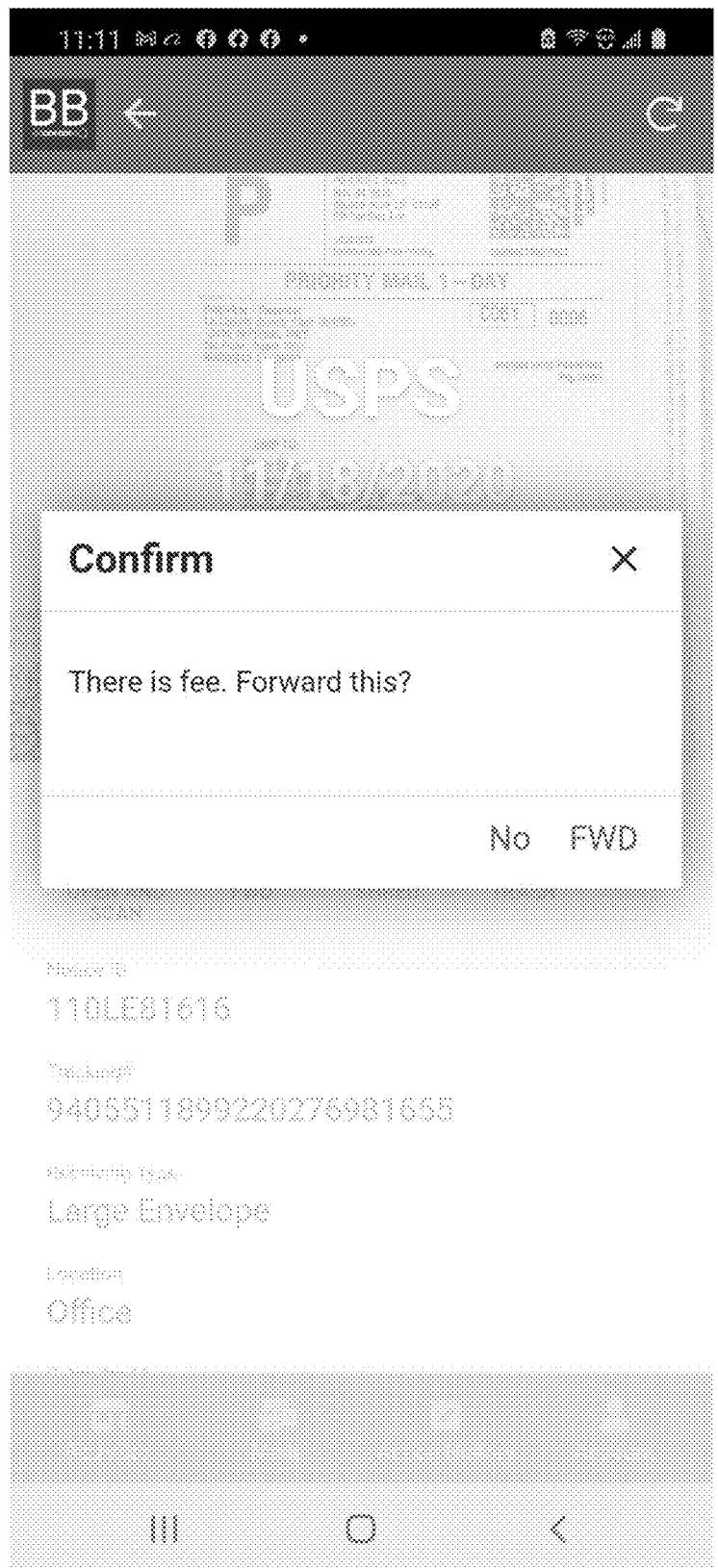
FIG. 9 shows a screenshot from the mobile application of the system according to embodiments of the present invention.
Figure 10:
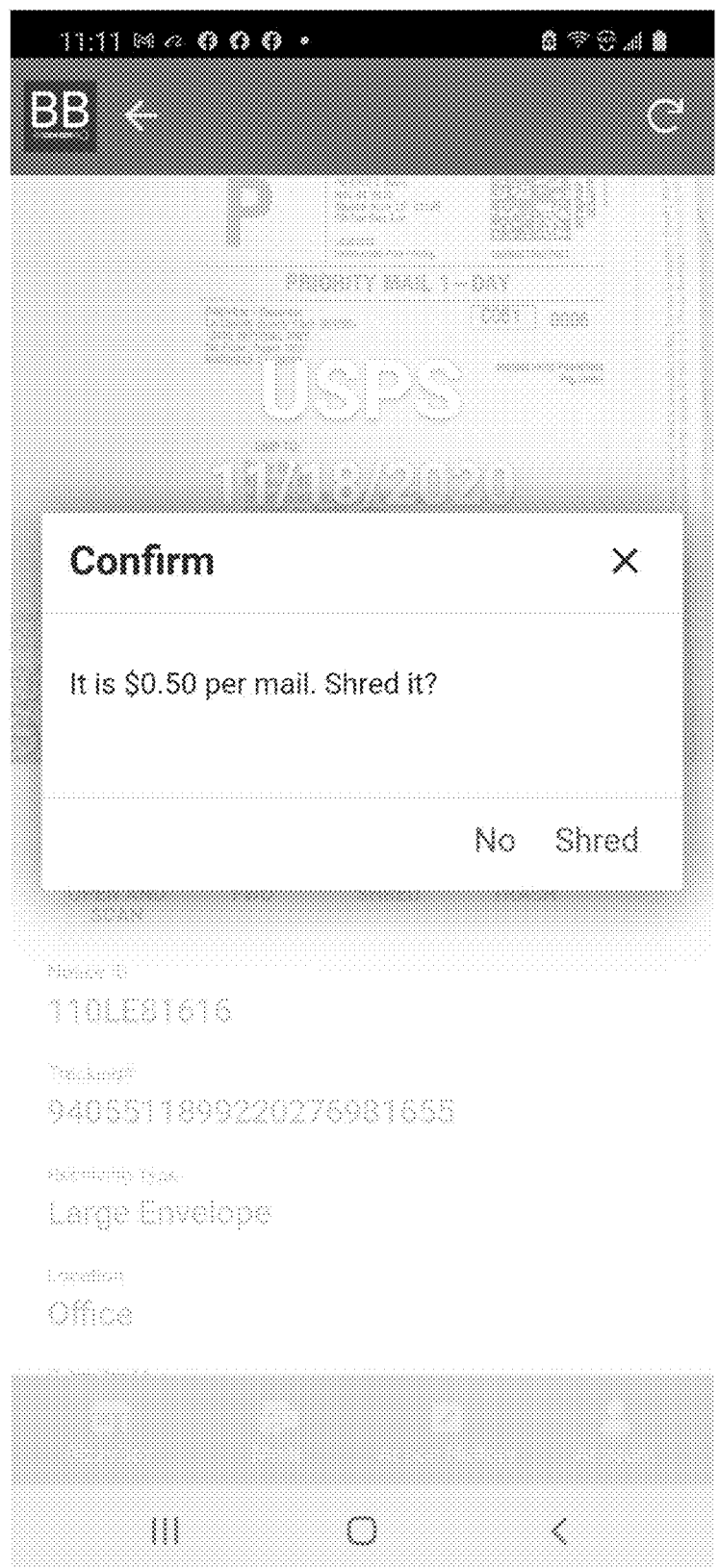
FIG. 10 shows a screenshot from the mobile application of the system according to embodiments of the present invention.

As shown in FIG. 6, after successful login into the mobile application, users can select their package(s) from their packages shown in the mail menu, which then brings up the package submenu as shown in FIG. 7. A package information is retrieved from the server to show at least some of the information from the mailbox db on the menu. As shown in the package submenu or sub-screen displayed on FIG. 7, a unique notice ID for the mail/package, the tracking number of the mail or package, the type of mail/package (e.g. large envelope, box, letter, etc.), the location of the mail/package, the person (owner/manager or staff) who entered the mail or package into the system, and the date that the notice ID was generated. On the mail menu, several action options are presented to the users as shown in FIG. 6 as well as in the package submenu shown in FIG. 7. The virtual mailbox user would likely select the "open and scan" action option 41, as shown in FIGS. 3, 7, and 8, which indicates to the system that the user provided their permission to open the mail or package, scan the contents contained therein, store the scanned contents in the server, and transmit, from the server, to the mobile application on the virtual mailbox user's mobile device a scanned image file or PDF displaying the contents of the mail/package. On the other hand, the virtual mailbox user may decide to select the "forward" action option 42, as shown in FIGS. 3, 7, and 9, to forward the mail or package to another address or to a physical mailbox at the client-mailbox store. If the virtual mailbox user decides that the mail/package is no longer needed, then they can permanently remove and destroy the mail or package by choosing the "shred" action option 43 as shown in FIGS. 3, 7, and 10. If the virtual mailbox user wants to remove the package and have it thrown away, then the virtual mailbox user may choose the "trash" action option 44 as shown in FIGS. 3, 6, 7, and 11.

The physical mailbox user, on the other hand, would likely rather receive the physical mail/parcel. With this preference in mind, the physical mailbox user would unlikely choose the "open and scan" action option. Rather, the physical mailbox user will likely opt to forward the mail to their physical address or another address if they don't want the client-mailbox store to hold their packages in their physical mailbox at the client-mailbox store location. Alternatively, the physical mailbox user may not want to receive the mail or package and may choose either the shred or trash action options to dispose of the mail or package from a number of menus as shown in FIGS. 6, 7, and 11.

Figure 11:
FIG. 11 shows a screenshot from the mobile application of the system according to embodiments of the present invention.
Figure 11:
Figure 11:
Figure 11:
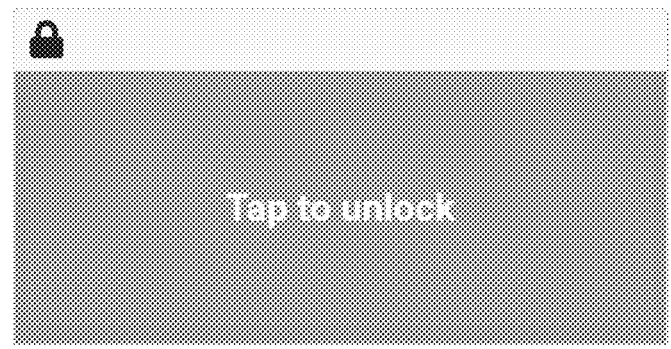
Figure 11:
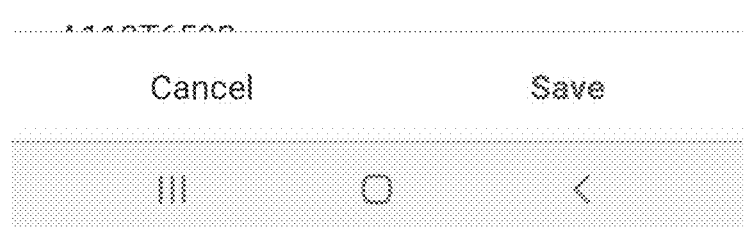

As shown in FIG. 11, the trash action option screen shows the mail or parcel about to be trashed as well as a unique identifier for this particular action (here, trashing the mail or package). The trash action option screen further provides a note field for users to provide any additional instructions to the owner/manager when trashing the selected mail or package. Further, the trash action option screen also provides a signature block to confirm that the user gave their permission to the owner/manager, and/or the staff, to trash the selected mail or package.

Following the selection of the action option (together with any required user confirmation), the selected action is processed by the mobile application as shown in FIG. 3 and then executed. A notice of the executed action will be sent to the user's registered email and/or the user's account on the mobile application providing a summary of the action taken and the time and date that the action was executed.

For owners/managers of brick-and-mortar mailbox rental businesses (included among the client-mailbox stores), these individuals may use this mobile application to quickly setup and manage their existing physical mailbox business while, at the same time, provide them with the ability to leverage their physical mailbox services to provide additional virtual mailbox services their customers. These owner/managers will likely start the mobile application and setup the mobile application as a member of the admin user class as described above. These individuals may also have staff that can register under the staff user class. As shown in FIGS. 1 and 3, the proprietors of brick-and-mortar mailbox rental businesses may have a number of physical mailboxes that are open for rental/subscription. They can have a mobile device in their store (e.g. a tablet connected to the internet on the counter) with the mobile application installed therein that the physical mailbox and virtual mailbox users can access in-store. In-store customers may use the owner/manager's in-store mobile device to register and subscribe to rent physical mailbox via the mobile application installed on the in-store mobile device. Alternatively, physical mailbox users and virtual mailbox users alike may sign-up/register for rental/subscription services from outside of the client-mailbox store using the mobile application installed on their mobile device for a private physical mailbox or virtual mailbox, where some features of each mailbox type able to crossover as provided by the system.

The mobile application, whether installed on an in-store mobile device or on a user's personal mobile device, provides a registration screen where the customer may type in their details into the form fields that are presented to them.

The form fields may be linked to other API such as Google Maps Javascript API to provide selection options from partial entries, autocorrection, and/or error detection in certain fields, such as the address field in this example. The customer-entered information will be stored in the server. Instead of registering in the brick-and-mortar location, the customer may choose from a list, presented to them by the mobile application, of physical mailbox locations that are registered with the mobile application and sort them via their distance with respect to the customer. Therefore, through the mobile application, the customer may register/subscribe to rent a physical mailbox from a brick-and-mortar proprietor from the comfort of their own home while, at the same time, choose a number of different services that are available for physical mailbox users and virtual mailbox users.

The owner/manager of the client-mailbox store can therefore leverage their existing physical mailbox services and provide value-added virtual mailbox services through the mobile application. As shown in FIG. 3, they can manage mailbox subscriptions and renewals through the mobile application. Furthermore, whenever the physical mailbox or virtual mailbox user is required to pay for any services associated with physical and/or virtual mailboxes, the mobile application provides a payment with form fields for most, if not all, of the major credit cards, online payment providers, and mobile payment and digital wallet services that use fiat currency or cryptocurrency.

Figure 12:
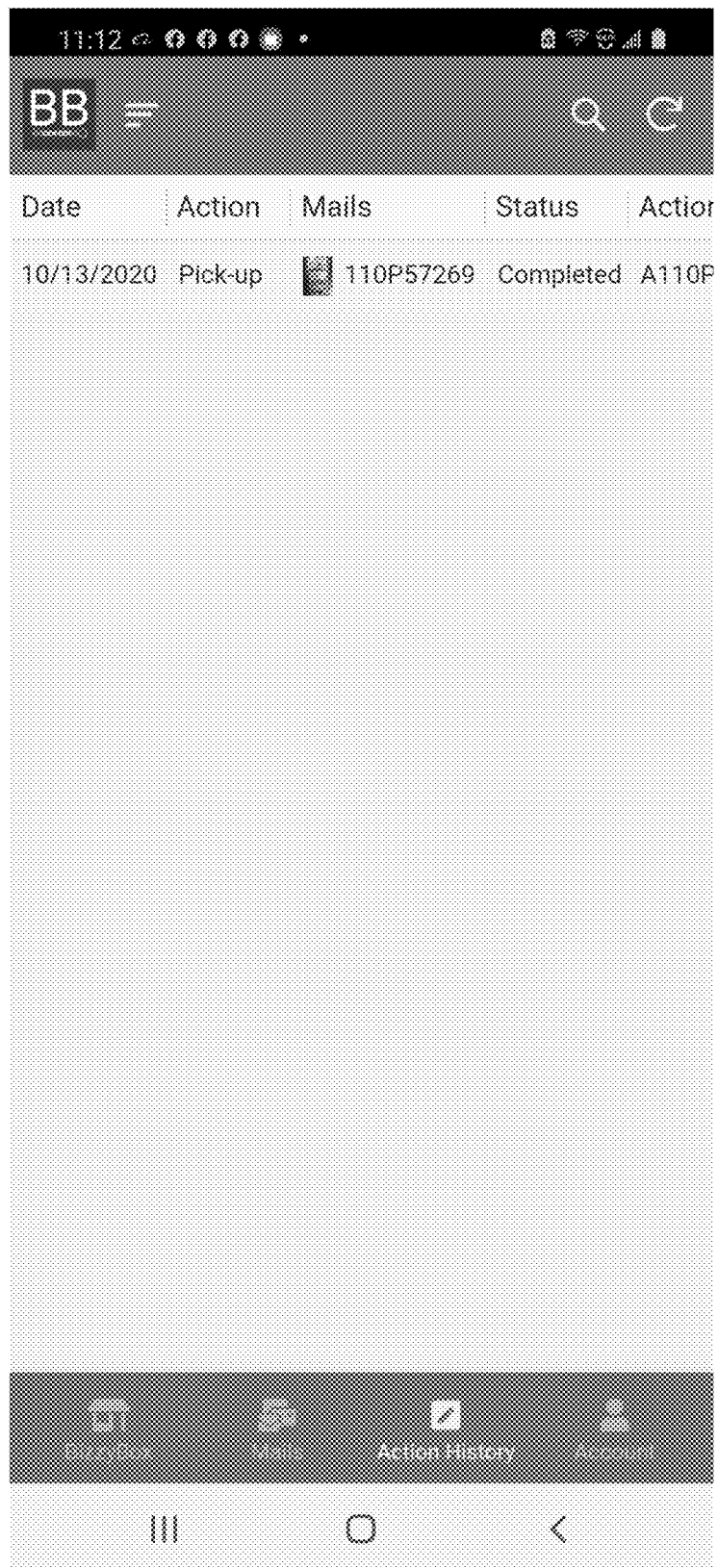
FIG. 12 shows a screenshot from the mobile application of the system according to embodiments of the present invention.
Figure 13:
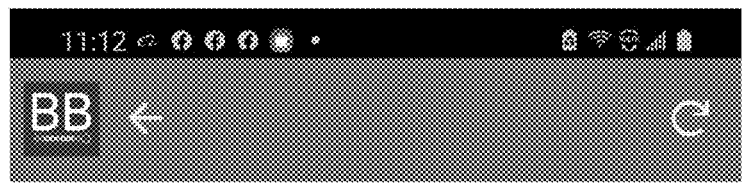
FIG. 13 shows a screenshot from the mobile application of the system according to embodiments of the present invention.
Figure 13:
Figure 13:
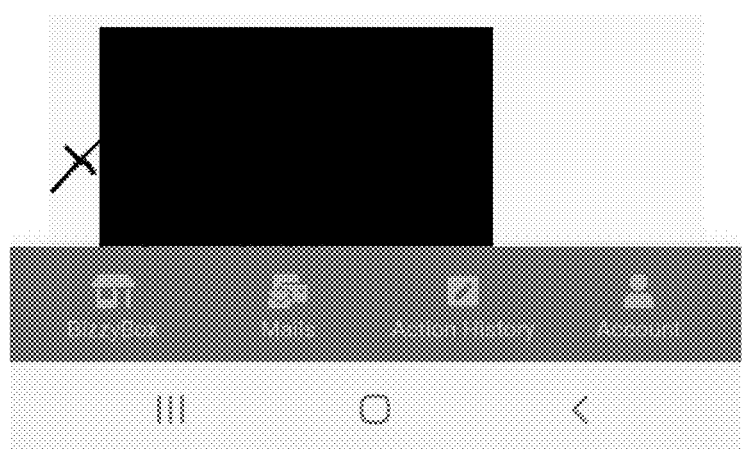

FIGS. 12 and 13 show the history of actions with respect to the mail/packages. As shown in FIG. 13, the customer goes to the physical location of the mail/package to pick up the package. As shown is the action history menu that provides a record of this action by recording and displaying the date, the type of action from the customer ("pick-up" is shown), the unique ID of the mail/package, its status ("completed"), and an action ID number. When the owner/manager selects the mail/package, a more detailed view of the transaction is shown on FIG. 14 together with any notes of the pick-up transaction, fee(s), and a record of the customer's signature (if required).

Figure 14:
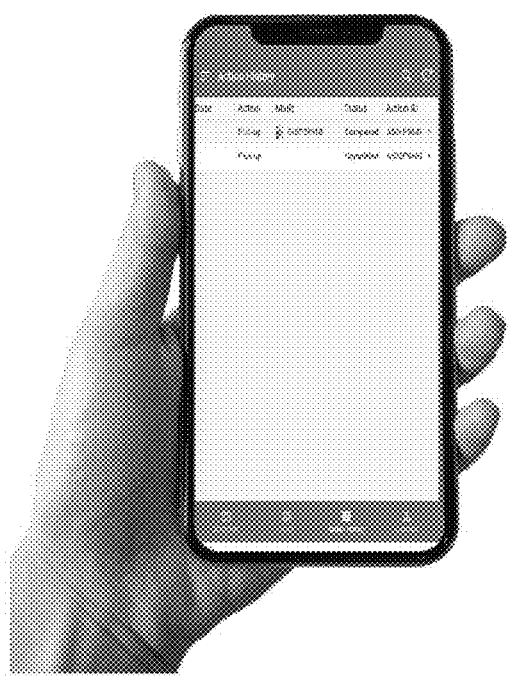
FIG. 14 shows views from the mobile application of the system according to embodiments of the present invention.
Figure 14:

FIG. 14 shows a view of FIG. 13, which is viewed by the customer or end-user. The admin and staff can view a more extensive list of mail/packages whose transactions have been completed or are queried to be completed. As shown in FIG. 14, the admin and staff view on the carrier menu displays the quantity of packages from the different carriers from different dates. If the admin or staff selects any of the carriers from the list, they will be taken to another menu showing a more detailed view of the packages.

Figure 15:
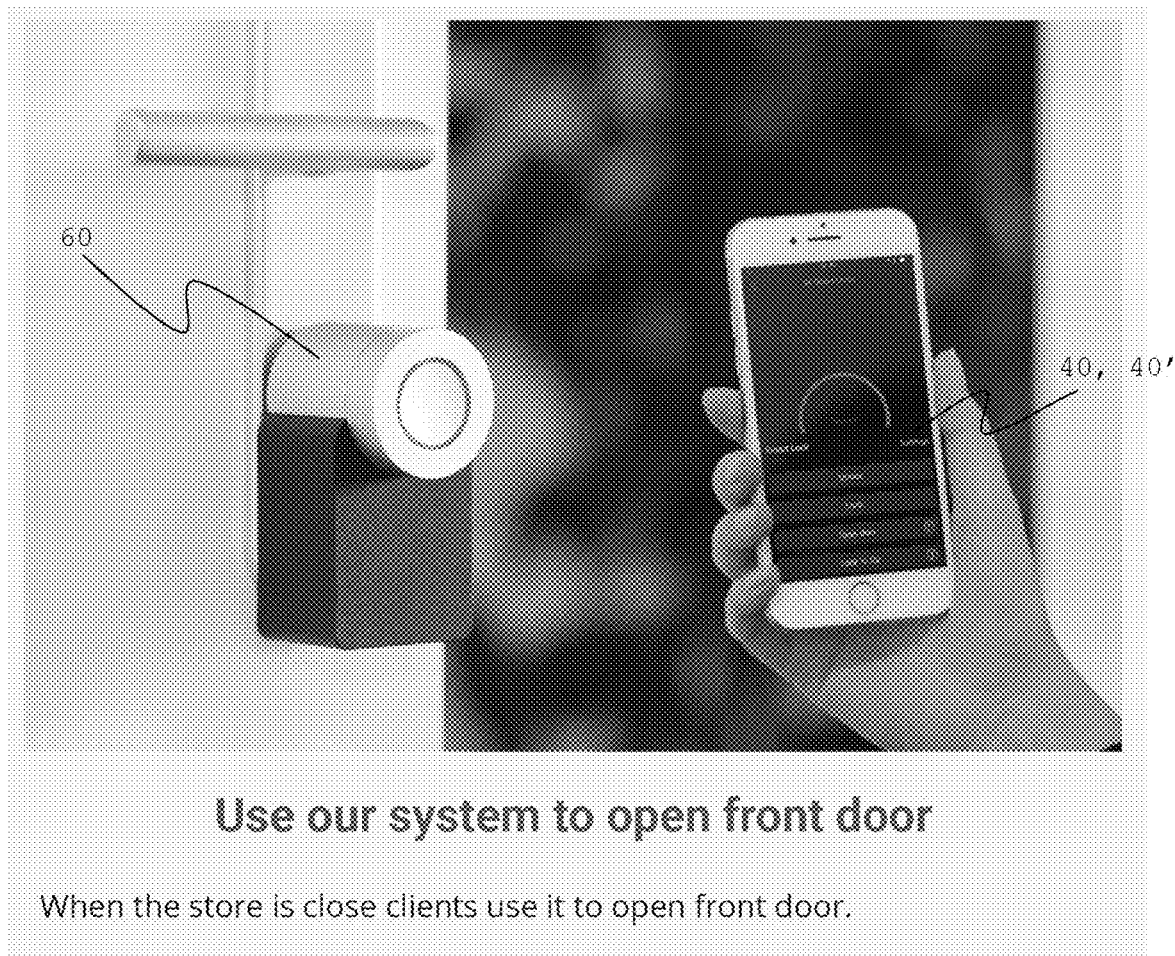
FIG. 15 shows a smart lock tool of the system according to embodiments of the present invention.

As shown in FIG. 15, for after hour pick-ups of physical mail, the mobile application further includes a smart lock module 60 to interact with the doors of participating brick-and-mortar mailbox providers during after hours when customers may decide to pick up mail from their rented/subscribed mailboxes. For those brick-and-mortar locations who offer after-hour access to mailboxes, the smart lock 60 can be configured recognize the door lock(s) that lead to the mailbox areas of the brick-and-mortar mailbox provider. The smart lock will be keyed to the physical location of the customer's mailbox rental/subscription such that the smart lock will recognize the customer's sign-in credentials and the customer's live mailbox rental/subscription, and will unlock the door upon input by the customer (see unlock button on FIG. 15) for entry in the mailbox area. The smart lock module may be further configured to unlock the mailbox itself, or present a signature form filed that requires the customer to sign-off for the package prior to unlocking the mailbox. The received signature will be transmitted and stored in the appropriate db in the server.

Figure 4:
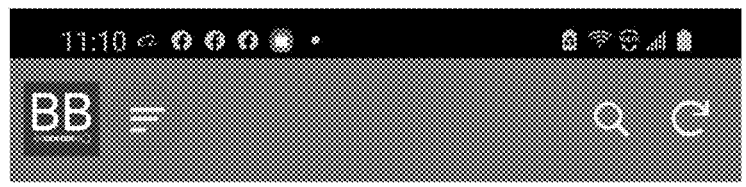
FIG. 4 shows a screenshot from a mobile application of the system according to embodiments of the present invention.
Figure 4:
Figure 4:
Figure 4:
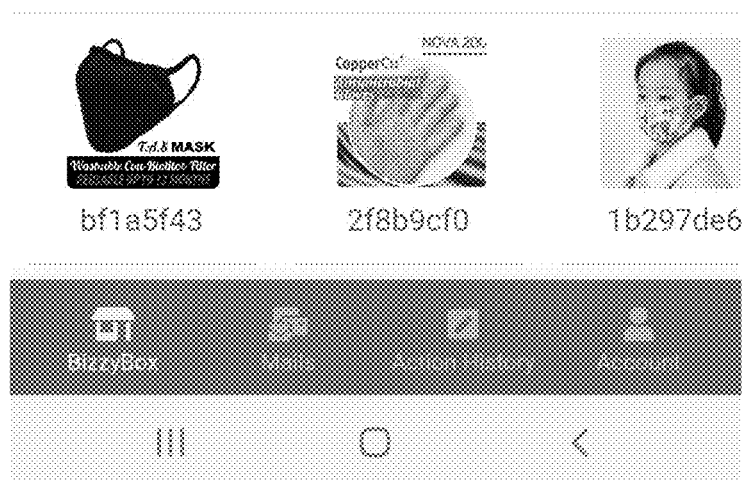
Figure 5:
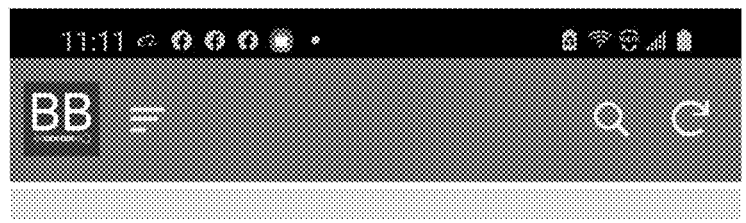
FIG. 5 shows a screenshot from the mobile application of the system according to embodiments of the present invention.
Figure 5:
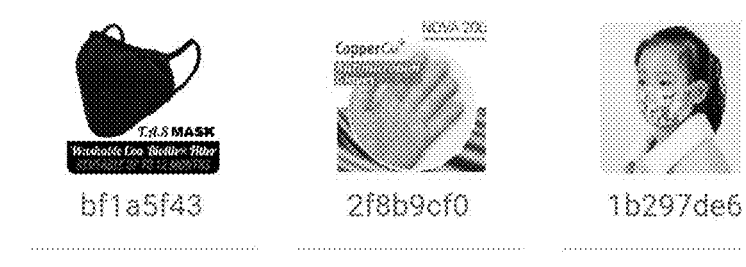
Figure 5:
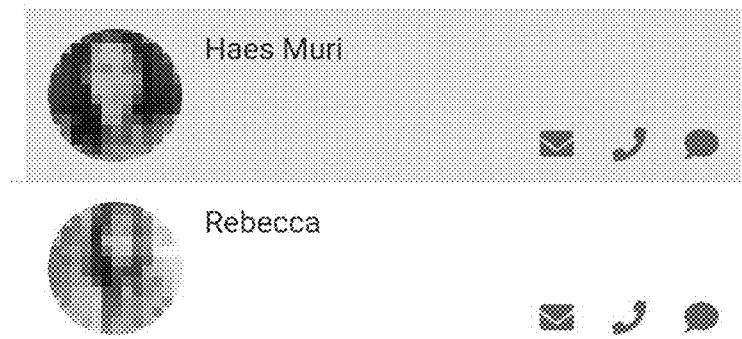
Figure 5:
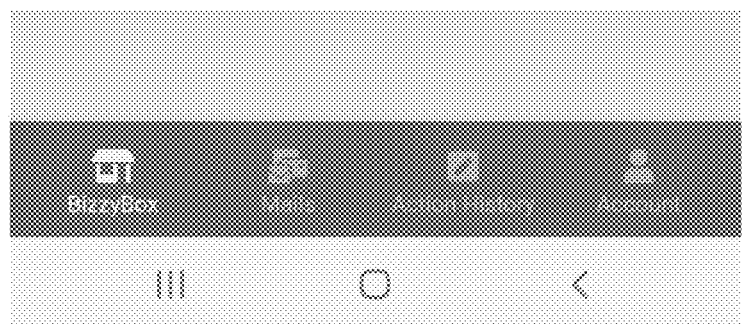

As shown in FIGS. 4 and 5, the mobile application may also include a shop unit that displays other goods for sale or other services provided at the client-mailbox store. For example, some client-mailbox stores not only provide mailbox services but also may offer several mail-related or unrelated items for sale. As shown in FIGS. 4 and 5, items sold by the client-mailbox store or other third-party vendors that may be affiliated or unaffiliated with the client-mailbox store may offer up for sale various goods and services. These goods and services are discretely advertised on mobile application as shown. If the advertised goods and services are sold in-store by the client-mailbox store, then the user of the mobile application may choose to purchase it through the mobile application for pick-up at the client-mailbox store or ship the item to another address. If the user registered with a client-mailbox store that is located nearby, then there may be same-day delivery service provided by the staff of the client-mailbox store to deliver the good at the appropriate addressed entered or selected by the user of the mobile application.

Figure 16:
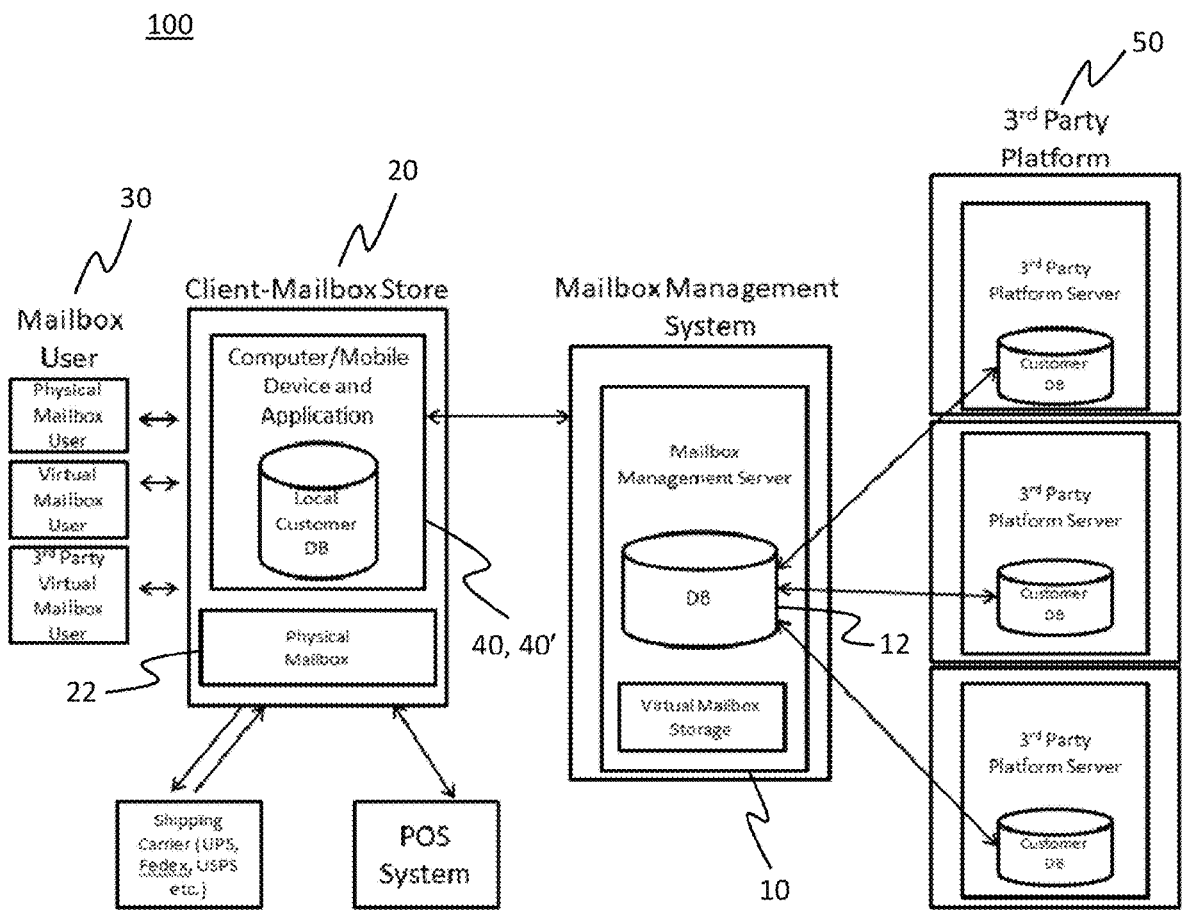
FIG. 16 shows a system according to embodiments of the present invention.

In another embodiment, features described in the first embodiment are included in this embodiment except for certain features pertaining to the third-party virtual mailbox user. In this embodiment, as shown in FIG. 16, the third-party virtual mailbox users are users of the mobile application and a third-party virtual mailbox application/platform. However, in this embodiment, the mobile application further includes API's that can be recognized by the third-party application to make available features on this mobile application that are available on the third-party virtual mailbox application/platform so that third-party virtual mailbox users can use at least some of the features of the third-party virtual mailbox application/platform on the mobile application of the system of this embodiment. For example, third-party virtual mailbox users in this embodiment may select the third-party platform of their choice, confirm with the third-party platform of their use of the mobile application which initiates and, after further confirmation by the user, integrates at least some of the features from the third-party platform into the mobile application such that virtual or physical mail/packages can be controlled via the presented action options in the mail menu of the mobile application as shown in FIGS. 6 and 7. Furthermore, if the third-party virtual mailbox user uses a third-party virtual mailbox platform, the third-party virtual mailbox user may also use the mobile application to view their mail/packages controlled stored or held in the third-party platform via cross-communication between the system and the third-party virtual mailbox platform. In other words, actions performed by the third-party virtual mailbox user while using the mobile application may be reflected in the third-party platform.

After the mail/parcel arrives at the location of the physical mailbox of the client-mailbox store, the owner/manager or the staff of the client-mailbox store inputs the label information of the mail/parcel into the mobile application (manually or by scanning the mailing label with a mobile device using the label recognition unit of the mobile application that was described in the first embodiment), and then searches the third-party virtual mailbox user db of the mail management system and the local customer db 14 via the search unit of the mobile application to determine whether the label information sufficiently corresponds to a user of the local customer db 14 or the third-party virtual mailbox user information provided by the third-party virtual mailbox user db (primarily, the third-party virtual mailbox user's name and the private mailbox number for the private mailbox that is allocated to them). The result of this search will be displayed in the mobile application. If there is a match with a user of the local customer db 14, the mobile application for the client-mailbox store owner/manager or staff allows uploading the scanned mailing label to be viewed by the user of the local customer db 14.

If there is a match with the third-party virtual mailbox user db, then a confirmatory weblink is provided in the mobile application for the client-mailbox store owner/manager or staff to click that notifies the third-party virtual mail provider that the mail/parcel that was received in the private mailbox designated to the third-party virtual mailbox user further confirmed by the uploaded mailing label. The mobile application notifies the third-party virtual mailbox user as well. More preferable, the result of the match will be displayed in the mobile application and the system will automatically notify (in the background) the third-party virtual mailbox user and the third-party virtual mailbox provider of receipt of the mail/parcel with an automatic upload provided to the latter from the system.

Following confirmation of a match between the label information and a user of the local customer db 14, the client-mailbox store owner/manager and/or their staff may await for further instructions from the user to perform any of the following actions: open the identified mail/parcel and scan the contents as images or PDF's (ISO 32000-1), forward the mail/parcel to another address, shred the mail/parcel, or trash the mail parcel.

Following confirmation of a match between the label information and the third-party virtual mailbox user, the client-mailbox store owner/manager and/or their staff will await for further instructions from the third-party virtual mailbox user, as communicated by the third-party virtual mailbox provider, to perform any of the following actions: open the identified mail/parcel and scan the contents as images or PDF's (ISO 32000-1), forward the mail/parcel to another address, shred the mail/parcel, or trash the mail parcel. However, there is a bottleneck in this operation as explained in the first embodiment Preferably, it will be stipulated in the agreement between the client-mailbox store, the third-party virtual mailbox provider, and the third-party virtual mailbox user that the client-mailbox store owner/manager and/or their staff will proceed to scan and make available the contents of the mail/package to mobile application and the third-party virtual mailbox provider following confirmation of the match and payment of any fees by the third-party virtual mailbox user. Any other actions (e.g. forwarding, shredding, or trashing) will likely require confirmation and payment of fees from the third-party virtual user that are entered and received through the mobile application. The system of the present embodiment is configured to integrate with several of these third-party virtual mailbox providers as a way to provide physical mailboxes for the third-party virtual mailbox providers.

While the invention has been shown and described with reference to different embodiments thereof, it will be appreciated by those skilled in the art that variations in form, detail, compositions and operation may be made without departing from the spirit and scope of the invention as provided here.

What is claimed is:

1. A system for providing mailbox management service, comprising:
    a server which includes a database;
    a client-mailbox store, which includes a physical mailbox assigned to a mailbox user;
    a mailbox management application installed on a mobile device of a client-mailbox store operator wherein the mailbox management application is connected to a camera; and
    a mobile application installed on a mobile device of the mailbox user,
wherein the server is connected to the mailbox management application and the mobile application,
wherein the server is connected to a third party virtual mailbox provider, and the database includes a mailbox user database, wherein the mailbox management application is configured to receive label information of a mail, which the client-mailbox store receives from a carrier, from the client-mailbox store operator,
wherein the server is configured to receive the label information of the mail from the mailbox management application and send a label to the mobile application of the mailbox user if the mail is directed to the mailbox user, and
wherein upon receiving the label information of the mail, the server is configured to search the mailbox user database in order to find a matching mailbox user which matches the label information of the mail,
wherein upon finding the matching mailbox user, the server is configured to send the label information of the mail to the matching mailbox user, and
wherein if the server fails to find the matching mailbox user from the mailbox user database, the server is configured to send a request to the third party virtual mailbox provider to find the matching mailbox user from a mailbox user database of the third party virtual mailbox provider.

2. The system of claim 1, wherein the mobile application is configured to present an open and scan action option to the mailbox user concerning the mail,
    wherein upon selection of the open and scan action, the mobile application is configured to place an order to the client-mailbox store to open the mail and scan contents therein, and wherein upon receiving the order of the open and scan action, the mailbox management application is configured to receive and transmit to the server a scanned copy of the contents of the mail and the server is configured to send the scanned copy of the contents of the mail to the mobile device of the mailbox user such that the client-mailbox store operator processes the order of the open and scan action by opening the mail and scanning the contents of the mail using the mailbox management application.

3. The system of claim 2, wherein the mobile application is further configured to present a forward action option, a shred action option, and a trash action option, wherein upon selection of the forward action option, the mobile application is configured to place an order to the client-mailbox store to forward the mail to an address designated by the mailbox user,
    wherein upon receiving the order of the forward action option, the mailbox management application is configured to notify the client-mailbox store operator of the order of the forward action option so that the client-mailbox store operator processes the order of the forward action option by forwarding the mail to the address designated by the mailbox user,
    wherein upon selection of the shred action option, the mobile application is configured to place an order to the client-mailbox store to shred the mail,
    wherein upon receiving the order of the shred action option, the mailbox management application is configured to notify the client-mailbox store operator of the order of the shred action option so that the client-mailbox store operator processes the order of the shred action option by shredding the mail, wherein upon selection of the trash action option, the mobile application is configured to place an order to the client-mailbox store to trash the mail, wherein upon receiving the order of the trash action option, the mailbox management application is configured to notify the client-mailbox store operator of the order of the trash action option so that the client-mailbox store operator processes the order of the trash action option by trashing the mail.

4. The system of claim 1, wherein the mailbox management application is configured to allow the client-mailbox store operator to assign the mail to the mailbox user if the mailbox user partially matches the label information of the mail, wherein the server is configured to save unmatched label information of the mail to the mailbox user database if the mailbox user partially matches the label information of the mail and the client-mailbox store operator assigns the mail to the mailbox user.

5. The system of claim 1, wherein the client-mailbox store includes a smart lock installed on a door of the client-mailbox store to enter the client-mailbox store, wherein the smart lock is constructed to open using the mobile application through near field communication between the smart lock and the mobile device of the mailbox user.

6. The system of claim 5, wherein the mobile device of the mailbox user further comprises a global positioning system ("GPS") and the server is connected to a door of the physical mailbox assigned to the mailbox user, wherein if the mobile device of the mailbox user is determined to be at the client-mailbox store via the GPS, the server is configured to send to the mobile device of the mailbox user a message to inquire to open the physical mailbox assigned to the mailbox user, wherein upon receiving confirmation to open the physical mailbox, the physical mailbox is constructed to open the door of the physical mailbox.

7. The system of claim 6, wherein before closing and locking the door of the physical mailbox, the server is configured to send to the mobile device of the mailbox user a message to confirm a pick-up of the mail.

8. The system of claim 1, wherein the client-mailbox store operator is a manager or a staff, and the mailbox management application provides different access levels between the manager and the staff, and wherein the database includes a staff data base.

9. The system of claim 8, wherein the staff data base includes a staff name, a staff contact information, and a staff timesheet.

10. The system of claim 9, wherein the staff data base further includes a time in and a time out of the staff, wherein the mobile device of the client-mailbox store operator includes a GPS to find out whether the mobile device of the client-mailbox store operator is at the client-mailbox store, wherein the mailbox management application is configured to record the time in of the staff if the mobile device of the staff is at the client-mailbox store.

11. The system of claim 1, wherein the mobile application includes a shop unit that displays goods for sale provided at the client-mailbox store.

12. The system of claim 11, wherein the shop unit provides an option of pick-up of a purchased good from the physical mailbox of the mailbox user or delivery of the purchased good to a provided address.

13. The system of claim 1, wherein the server is connected to a shipping service provider and the mobile application is configured to present a forward action option, wherein upon selection of the forward action option, the mobile application is configured to place an order to the client-mailbox store to forward the mail to an address designated by the mailbox user, wherein upon receiving the order of the forward action option, the server is configured to send the label information of the mail and the address designated by the mailbox user to the shipping service provider.

14. A system for providing mailbox management service, comprising:

a server which includes a database;

a plurality of client-mailbox stores, which include physical mailboxes;

a mailbox management application installed for each client-mailbox store; and a mobile application installed on a mobile device of a mailbox user, wherein the server is connected to the mailbox management application and the mobile application, wherein the server is connected to a plurality of third party virtual mailbox providers, and the database includes a mailbox user database, wherein upon receiving a mail from a carrier, the server is configured to search the mailbox user database in order to find a matching mailbox user which matches label information of the mail, wherein upon finding the matching mailbox user, the server is configured to send the label information of the mail to the matching mailbox user, and wherein if the server fails to find the matching mailbox user from the mailbox user database, the server is configured to send a request to the third party virtual mailbox provider to find the matching mailbox user from a mailbox user database of the third party virtual mailbox provider.

15. The system of claim 14, wherein the mailbox management application is configured to allow a client-mailbox store operator to assign the mail to the mailbox user if the mailbox user partially matches the label information of the mail, wherein the server is configured to save unmatched label information of the mail to the mailbox user database if the mailbox user partially matches the label information of the mail and the client-mailbox store operator assigns the mail to the mailbox user.

16. The system of claim 14, wherein the client-mailbox store includes a smart lock installed on a door of the client-mailbox store to enter the client-mailbox store, wherein the smart lock is constructed to open using the mobile application through near field communication between the smart lock and the mobile device of the mailbox user, wherein the mobile device of the mailbox user further comprises a GPS and the server is connected to a door of the physical mailbox assigned to the mailbox user, wherein if the mobile device of the mailbox user is determined to be at the client-mailbox store via the GPS, the server is configured to send to the mobile device of the mailbox user a message to inquire to open the physical mailbox assigned to the mailbox user, wherein upon receiving confirmation to open the physical mailbox, the physical mailbox is constructed to open the door of the physical mailbox.

17. The system of claim 16, wherein the client-mailbox store includes a smart lock installed on a door of the client-mailbox store to enter the client-mailbox store,
wherein the smart lock is constructed to open using the mobile application through near field communication between the smart lock and the mobile device of the mailbox user,
wherein the mobile device of the mailbox user further comprises a GPS and the server is connected to a door of the physical mailbox assigned to the mailbox user,
wherein if the mobile device of the mailbox user is determined to be at the client-mailbox store via the GPS, the server is configured to send to the mobile device of the mailbox user a message to inquire to open the physical mailbox assigned to the mailbox user,
wherein upon receiving confirmation to open the physical mailbox, the physical mailbox is constructed to open the door of the physical mailbox.

18. A system for providing mailbox management service, comprising:
a server which includes a database;
a plurality of client-mailbox stores, which include physical mailboxes;
a mailbox management application installed for each client-mailbox store; and
a mobile application installed on a mobile device of a mailbox user,
wherein the server is connected to the mailbox management application and the mobile application,
wherein the server is connected to a plurality of third party virtual mailbox providers, and the database includes a mailbox user database,
wherein upon receiving a mail from a carrier, the server is configured to search the mailbox user database in order to find a matching mailbox user which matches label information of the mail,
wherein upon finding the matching mailbox user, the server is configured to send the label information of the mail to the matching mailbox user,
wherein if the mailbox user is the matching mailbox user, the mobile application is configured to present an open and scan action option to the mailbox user concerning the mail,
wherein upon selection of the open and scan action, the mobile application is configured to place an order to the client-mailbox store to open the mail and scan contents therein, and
wherein upon receiving the order of the open and scan action, the mailbox management application is configured to receive and transmit to the server a scanned copy of the contents of the mail and the server is configured to send the scanned copy of the contents of the mail to the mobile device of the mailbox user such that the client-mailbox store operator processes the order of the open and scan action by opening the mail and scanning the contents of the mail using the mailbox management application.

19. The system of claim 18, wherein if the mailbox user is the matching mailbox user, the mobile application is further configured to present a forward action option, a shred action option, and a trash action option,
wherein upon selection of the forward action option, the mobile application is configured to place an order to the client-mailbox store to forward the mail to an address designated by the mailbox user,
wherein upon receiving the order of the forward action option, the mailbox management application is configured to notify the client-mailbox store operator of the order of the forward action option so that the client-mailbox store operator processes the order of the forward action option by forwarding the mail to the address designated by the mailbox user,
wherein upon selection of the shred action option, the mobile application is configured to place an order to the client-mailbox store to shred the mail,
wherein upon receiving the order of the shred action option, the mailbox management application is configured to notify the client-mailbox store operator of the order of the shred action option so that the client-mailbox store operator processes the order of the shred action option by shredding the mail,
wherein upon selection of the trash action option, the mobile application is configured to place an order to the client-mailbox store to trash the mail,
wherein upon receiving the order of the trash action option, the mailbox management application is configured to notify the client-mailbox store operator of the order of the trash action option so that the client-mailbox store operator processes the order of the trash action option by trashing the mail.

\* \* \* \* \*